United States Patent [19]

Tsukagoshi

[11] Patent Number: 5,351,083
[45] Date of Patent: Sep. 27, 1994

[54] PICTURE ENCODING AND/OR DECODING SYSTEM

[75] Inventor: Ikuo Tsukagoshi, Tokyo, Japan

[73] Assignee: Sony Corporation, Tokyo, Japan

[21] Appl. No.: 957,481

[22] Filed: Oct. 7, 1992

[30] Foreign Application Priority Data

| Oct. 17, 1991 | [JP] | Japan | 3-296529 |
| Dec. 27, 1991 | [JP] | Japan | 3-360698 |
| Dec. 27, 1991 | [JP] | Japan | 3-360699 |

[51] Int. Cl.$^5$ .................. H04N 7/137; H04N 7/133
[52] U.S. Cl. .................. 348/384; 348/402; 348/403; 348/404; 348/405
[58] Field of Search .................. 358/133, 135, 136; 348/405, 407, 402, 403, 404, 384; H04N 7/137, 7/133

[56] References Cited

U.S. PATENT DOCUMENTS

| 4,591,909 | 7/1986 | Kurade et al. | 358/136 |
| 4,667,233 | 5/1987 | Furukawa | 358/136 |
| 4,683,494 | 7/1987 | Furukawa et al. | 358/136 |
| 4,723,161 | 2/1988 | Koga | 358/135 |
| 4,734,767 | 3/1988 | Kaneko et al. | 358/135 |
| 4,802,005 | 1/1989 | Kondo | 358/135 |
| 4,851,906 | 7/1989 | Koga et al. | 358/133 |
| 4,939,586 | 7/1990 | Nabati et al. | 360/32 |
| 5,025,482 | 6/1991 | Murakami et al. | 358/135 |
| 5,046,071 | 9/1991 | Tanoi | 358/135 |
| 5,115,309 | 5/1992 | Hang | 358/133 |
| 5,130,797 | 7/1992 | Murakami et al. | 358/133 |
| 5,150,432 | 9/1992 | Ueno et al. | 358/135 |
| 5,153,720 | 10/1992 | Kawai | 358/105 |
| 5,227,877 | 7/1993 | Yukitake | 358/135 |

FOREIGN PATENT DOCUMENTS

| 0296948 | 12/1988 | European Pat. Off. | H04N 9/82 |
| 0382892 | 8/1990 | European Pat. Off. | H04N 7/137 |
| 0412713 | 2/1991 | European Pat. Off. | H04N 7/133 |
| 0466331 | 1/1992 | European Pat. Off. | H04N 5/14 |
| 0476603 | 3/1992 | European Pat. Off. | H04N 7/13 |
| 0479511 | 4/1992 | European Pat. Off. | H04N 7/137 |
| 0498938 | 8/1992 | European Pat. Off. | H04N 7/137 |
| 0499088 | 8/1992 | European Pat. Off. | H04N 7/137 |
| WO91/11074 | 7/1991 | PCT Int'l Appl. | H04N 7/00 |
| 2003001 | 2/1979 | United Kingdom | H04N 7/13 |

OTHER PUBLICATIONS

Patent Abstracts of Japan vol. 15, No. 9 (E–1021) Oct. 24, 1990 & JP-A-02-261 264 (Toshiba Corp.) Jan. 9, 1991.

Patents Abstracts of Japan vol. 15, No. 265 (E–1086) Apr. 12, 1991 & JP-A-03 088 488 (Toshiba Corp.) Jul. 5, 1991.

Frequenz: Zeitschrift Fu Telekommunikation vol. 43, No. 5, May 1, 1989, Berlin, DE pp. 126–133 XP50919 M. Gilge et al. 'Codierung von farbigen Bewegtbildszene mit 624kbit/s. Ein neuer Ansatz zur Verwirklichung eines Bildtelefons im ISDN (Teil III)' p. 127, left column, line 3–p. 130, right column, line 14; figures 40–49.

IEEE International Conference on Communications ICC 1990 vol. 3/4, Apr. 15, 1990, Atlanta Ga., USA pp. 1054–1058 XP145991 I. Tamitani et al. 'A Real-Time HDTV Signal Processor: HD-VSP System and Applications' paragraph III.

Patent Abstracts of Japan vol. 15, No. 9 (E–1021) Oct. 24, 1990 & JP-A-02 261 264 (Toshiba Corp.) Jan. 9, 1991.

Patent Abstracts of Japan vol. 15, No. 265 (E–1086) Apr. 12, 1991 & JP-A-03 088 488 (Toshiba Corp.) Jul. 5, 1991.

*Primary Examiner*—Tommy P. Chin
*Assistant Examiner*—Vu Le
*Attorney, Agent, or Firm*—William S. Frommer; Alvin Sinderbrand

[57] ABSTRACT

In a picture encoding and/or decoding system, fast motion region blocks and slow motion region blocks are repeated by a classifying unit on the basis of motion vector to thereby be able to adaptively change. A majority decision is made as to the predetermined block with the surrounding blocks an isolated block of which is replaced by the surrounding block to thereby be able to enhance picture quality. Data of border portions of adjacent channels divided is overlapped on a border portion of each channel to thereby be able to avoid transmission of unnecessary amount of information.

9 Claims, 17 Drawing Sheets

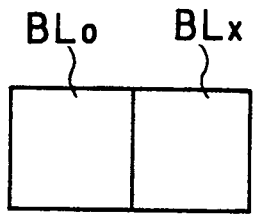
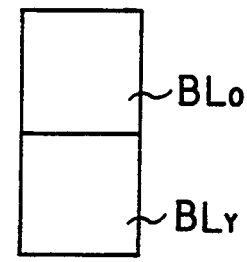
FIG. 5A  FIG. 5B
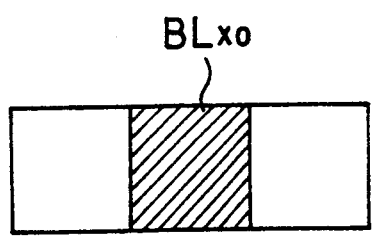
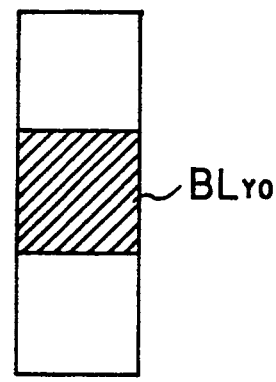
FIG. 6A  FIG. 6B

S31

| 3 | 3 | 5 | 4 | 5 | 5 | 7 | 3 |
|---|---|---|---|---|---|---|---|
| 4 | 3 | 3 | 4 | 4 | 4 | 5 | 5 |
| 3 | 3 | 8 | 5 | 5 | 7 | 3 | 3 |
| 4 | 3 | 6 | 5 | 5 | 6 | 2 | 2 |
| 3 | 4 | 4 | 5 | 5 | 6 | 2 | 6 |

| 0 | 1 | 0 | 1 | 0 | 0 | 0 | 0 |
|---|---|---|---|---|---|---|---|
| 0 | 1 | 0 | 1 | 0 | 1 | 1 | 1 |
| 1 | 1 | 0 | 1 | 1 | 0 | 1 | 1 |
| 0 | 1 | 0 | 1 | 1 | 1 | 1 | 1 |
| 0 | 1 | 1 | 1 | 1 | 1 | 1 | 0 |

| 0 | 0 | 1 | 0 | 0 | 0 | 0 | 0 |
|---|---|---|---|---|---|---|---|
| 0 | 1 | 1 | 1 | 1 | 1 | 1 | 1 |
| 0 | 1 | 1 | 1 | 1 | 1 | 1 | 1 |
| 0 | 1 | 1 | 1 | 1 | 1 | 1 | 1 |
| 0 | 1 | 1 | 1 | 1 | 1 | 1 | 0 |

FIG. 14C

PICTURE ENCODING AND/OR DECODING SYSTEM

BACKGROUND OF THE INVENTION

1. Field of the Invention

This invention relates to a picture encoding and/or decoding system, and more particularly is applicable to transmitting, recording, etc. a motion picture.

2. Description of the Prior Art

First of all, to compress picture information in transmitting picture data to remote places or recording it in a recording media such as a magnetic tape, there have been adapted various coding methods, such as predictive coding, transformation coding, and hybrid coding combining the predictive coding and the transformation coding together, which are methods comprising redundancy suppressing coding of picture signals.

Predictive coding comprises intrafield prediction and interframe prediction, the former being performed according to previous sample prediction and 1 line prediction utilizing correlations between adjacent pixels, while the latter being performed according to frame previous sample prediction and motion compensation (MC) prediction using interframe correlations.

The transformation coding is such that utilizing correlation picture signals have sampled values (hereinafter referred to as picture data) that are transformed to coordinates of which axis are orthogonal to each other, to thereby remove correlations between picture data for decreasing the amount of data. There are adapted orthogonal transformations in which so-called basic vectors are orthogonal to each other, where the pretransformation mean signal power is equal in total sum to mean signal power of so-called transformation coefficients obtained by orthogonal transformation, providing a power concentration degree to low frequency components which is excellent. Known examples are Hadamard transformation, Haar transformation, Karhunen-Loeve (K-L) transformation, discrete cosine transformation (DCT), discrete sine transformation (DST), slant transformation, etc..

The DCT divides a picture to picture blocks each consisting of n pixels in both horizontal and vertical directions (n × n) in spatial allocation, and orthogonal transforms picture data in picture blocks using cosine. DCT has a high speed computing algorithm, and is widely used in the transmission and recording of picture data since one chip LSI which enables real time transformation of picture data has been realized.

Moreover, DCT has substantially the same characteristic as the K-L transformation which achieves optimum transformation at a point of power concentration degree to low frequency components directly affecting efficiency. Therefore, it is possible to greatly reduce the amount of information by encoding only components to which power concentrates.

In transmitting and recording picture data, transformation coefficients which have been obtained by discrete cosine transforming the picture data are quantized as described, and then the picture data is subjected to variable length coding (for example, Huffman coding, run length coding, etc.) for further compression. The resulting coded data is added with synchronizing signals, parity, etc. for conducting transmission and recording.

However in the conventional method using the motion compensation (MC) hybrid DCT, motion regions are coded without questioning whether or not the motion regions are regions of reproduced pictures that are susceptible to degradation if the regions are judged motion regions after mode judgment of intrafield DCT/interframe DCT. Although there is no problem at a relatively high coding rate, the quantizing step of DCT coefficients becomes rough at a low coding rate, and there can be a case in which in reproduced picture degradation of visually important portions is susceptible to degradation.

In such a case, it is necessary to suppress the amount of information at portions where degradation is visually less important and increase the amount of information at visually important portions. It is considered that more effective compression can be realized by paying attention to the follow-up characteristic of the viewer's eyes to the speed of motion. However, it is not possible to obtain information which represents a degree of motion by adaptation using remainder energy according to the conventional methods.

Secondly, a conventional motion picture coding apparatus which codes television signals, for example, may consist of an apparatus which performs high efficiency coding according to a technique called discrete cosine transform (DCT), in which an amount of information is suppressed at portions where visual degradation is less important, with respect to the traceability of the viewer's eyes to follow the speed of motion.

In a conventional motion compensation coding technique, adaptation to the degree of motion is not conducted. For adapting to the degree of motion in addition to the motion compensation coding, there is an attempt which distinguishes between rapid motion and slow motion (including still region) in a picture.

Practically, classification is carried out according to the direction and absolute value of each motion vector, and then equal classes are found between adjacent blocks to make correlations for distinguishing fast motions from slow motions (including still regions) in the picture.

However, motion vectors are calculated about individual blocks. For this reason, motion vectors are discontinuous between blocks and an irregular class inevitably appears. As a result, there is a problem in that when only very small area in a relatively slow motion area, for example, is judged to have a fast motion, this very small area becomes susceptible to errors and is therefore detected as a degradation in picture quality.

Thirdly, typically, a high frequency speed exceeding 20 MHz is required in coding, certain motion picture signals, for example, high definition television signal (HDTV). To meet this requirement motion, picture signals of one picture plane are divided into several channels and are subjected to parallel processing thereby achieving sufficient processing speed.

Practically, in such a coding processing, to code motion picture signals at a high compression rate, there is adopted a high efficiency coding method of motion compression discrete cosine transformation (DCT) in which amount of information is suppressed at visually less important portions, with respect to the traceability follow-up capacity of the viewer's eyes to follow speed of motion.

Additionally, there is a technique in which as adaptation to the degree of motion is conducted, classification of motion is simultaneously conducted according to the direction and absolute value of motion vectors. In such a procedure, equal classes between adjacent blocks are subsequently detected and correlations thereof are made, so that fast motions and slow motions (including still regions) in a picture are distinguished.

However, in a motion picture coding method in which a picture is divided into a plurality of channels and classification is performed as well as motion compensation DCT, the border portions between channels search ranges of motion vectors become narrow as compared to normal ranges and thus, there may be a problem in that the motion vectors of these border portions do not have the same detectability or the motion vectors of portions other than the border portions. This can result in that directions and amounts of movements of motion vectors have no correlations with those adjacent blocks.

Furthermore, in motion adaptive quantization, channel border portions which have no vector correlation are presumed fast, irrespective of actual motions, and therefore quantization is roughened. As a result, there can be a problem in the case where a picture is divided into channels crossing the horizontal axis, for example, picture quality deterioration of vertical stripe patterns along borders of channels is produced in a reproduced picture.

In conducting motion compensation as described, vectors of border portions of channels are not provided with enough search ranges. Therefore, they become discontinuous with the surrounding vectors and in motion adaptive quantization, picture quality is degraded at the border of channels.

SUMMARY OF THE INVENTION

In view of the foregoing, an object of this invention is to provide a motion adaptive picture encoder, comprising:

block means for dividing inputted picture data into blocks, each block consisting of n × n in spatial allocation; orthogonal transforming means for orthogonal transforming each block of picture data from this blocking means; quantizing means for quantizing orthogonal transformation coefficients of the picture data orthogonal transformed by this orthogonal transforming means; inverse quantizing means for inverse quantizing the orthogonal transformation coefficients of the picture data quantized by this quantizing means; inverse orthogonal transforming means for inverse orthogonal transforming the orthogonal transform coefficients of the picture data inverse quantized by this inverse quantizing means; storage means for storing one frame of the picture data inverse orthogonal transformed by this inverse orthogonal transforming means; motion vector detection means for detecting a motion vector of each block from the picture data, stored in this storage means, and inputted picture data; classifying means for classifying each block to a block of a fast motion picture region or a block of a slow motion picture region on the basis of the motion vector detected by this motion vector detection means; block power calculating means for calculating a power of each block of the picture data orthogonal transformed by the orthogonal transforming means, and quantizing step width control means for adaptively changing the quantization step width of each of the quantizing means and the inverse quantizing means of the basis of the power of each block calculated by this block power calculating means and a classification output from the classifying means, and wherein: the quantizing step width control means controls so as to assign a rough quantizing step width to blocks of the fast motion picture region and so as to assign a fine quantizing step width to blocks of the slow motion picture region.

In the motion adaptive picture encoder, blocked picture data is classified according to motion vectors into blocks of regions where motions are either fast or slow in the vector plane. As motion adaptive quantization is conducted, a different bit assignment is made to blocks of each region, thereby achieving low rate encoding.

Another object of this invention is to provide a picture processing apparatus which is capable of effectively preventing degradation in picture quality when conducting predetermined adaptive coding process after dividing a picture into blocks.

To achieve such an object, a picture processing apparatus 70, in which a picture S2 is divided into blocks and undergoes adaptive coding by a predetermined method, is provided with majority decision means 82 for making a majority decision as to a predetermined block with surrounding blocks, and for replacing an isolated block by the surrounding blocks.

When adaptive coding is conducted according to a predetermined method after dividing a picture into blocks a majority decision is made as to a predetermined block with surrounding blocks, and an isolated block is replaced by the surrounding blocks. This enables partial degradation in picture quality to be effectively prevented.

A further object is to provide a motion picture coding apparatus which is capable of achieving high efficiency coding in dividing and coding a picture of motion picture signals.

To achieve this object, in a motion picture coding apparatus 70 in which a motion picture S1 is divided into a plurality of channels Y1, Y2 and Y3 and is high efficiency coded in a parallel manner for each of the channels Y1, Y2, or Y3, there is provided overlapping means 45B for overlapping data Y102 and Y203 of border portions of each channel Y1, Y2, or Y3.

In overlapping means 45B, data Y102 and Y203 of border portions of adjacent channels Y1, Y2 and Y3 is overlapped on the border portion of each receptive channel. Thus, there is no misjudgment in determining motion adaptive coding, i.e. the motion is fast in the border portion of the channel, and in conducting motion compensation coding it is possible to avoid transmission of unnecessary amount of information due to inappropriate matching at the border portion.

The nature, principle and utility of the invention will become more apparent from the following detailed description when read in conjunction with the accompanying drawings in which like parts are designated by like reference numerals of characters.

BRIEF DESCRIPTION OF THE DRAWINGS

In the accompanying drawings:

FIGS. 5A and 5B are diagrams illustrating formation of Q-step planes of the classifying unit in the motion adaptive picture encoder shown in FIG. 3;

FIGS. 6A and 6B are diagrams illustrating correction of Q-step planes of the classifying unit in the motion adaptive picture encoder;

FIGS. 14A to 14C are diagrammatic views showing formation of Q-step plane by motion adaptation of the embodiment;

DETAILED DESCRIPTION OF THE INVENTION

Preferred embodiments of this invention will be described with reference to the accompanying drawings:
First Embodiment In the first embodiment described hereafter, the motion adaptive picture encoder of the present invention relates to a motion compensation hybrid DCT picture transmission system in which high efficiency DCT coding is performed, switching between interframe and motion compensation intrafield prediction.

Figure 1:
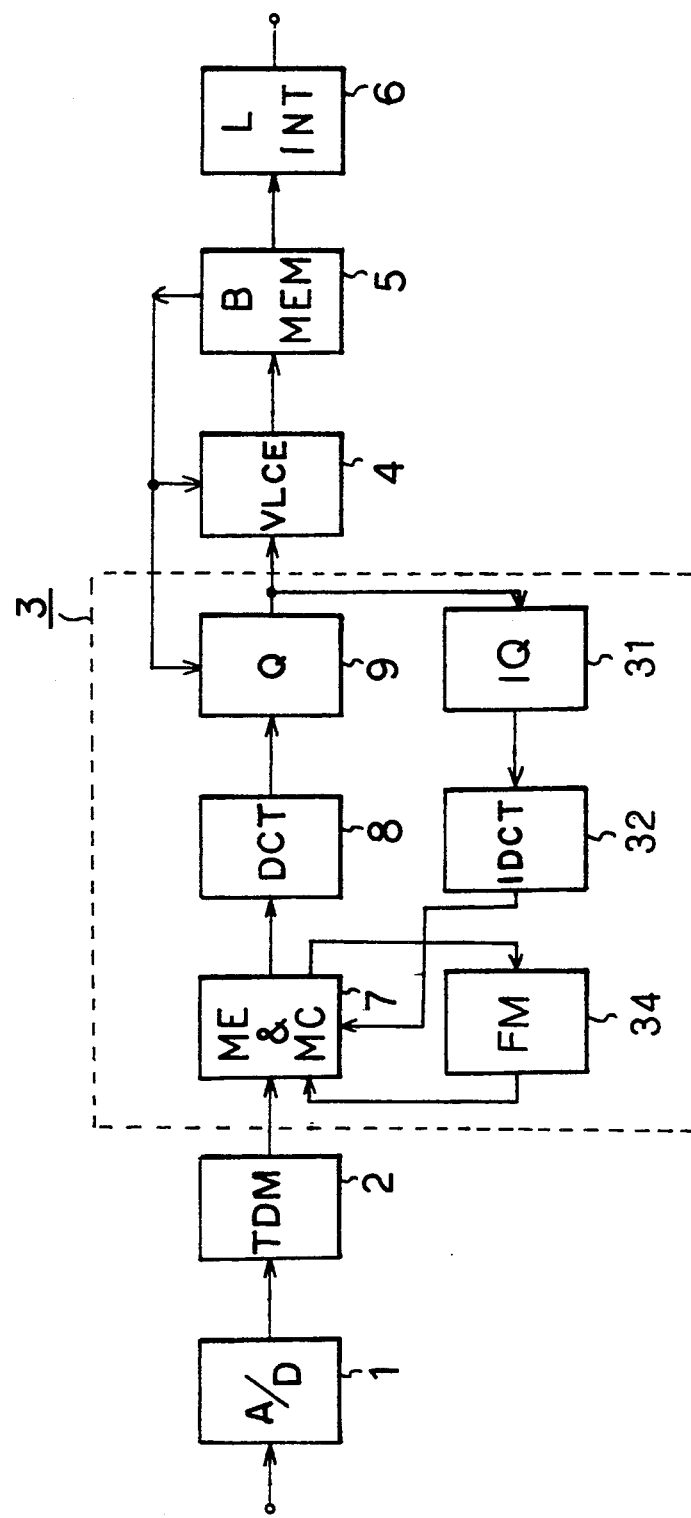
FIG. 1 is a block diagram showing the configuration of the transmitter side of first embodiment of picture data transmission system to which a motion adaptive picture encoder of the present invention is applied.

In this picture transmission system, an encoder of the picture data transmission side shown in FIG. 1, consists of the following: an analog/digital (A/D) converter 1 for digitalizing input analog video signals; a time division multiplexing (TDM) unit 2 for time division multiplexing (TDM) unit 2 for time division multiplexing the input picture data which has been digitized by this A/D converter 1; a motion adaptive picture encoder 3 for coding the input picture data according to motion compensation hybrid DCT, the picture data being time division multiplexed by TDM unit 2, generally comprises a motion compensation unit 7, a DCT unit 8, a quantizer 9, an inverse quantizer 31, an inverse DCT unit 32, and a one frame memory 34; a variable length encoder 4 for variable length coding quantized data of DCT coefficients, which are by the motion adaptive picture encoder 3; a buffer memory 5 for storing quantized data of the DCT coefficients, which are variable length coded by this variable length encoder 4; and a line interface 6 for sending quantized data of the DCT coefficients stored in this buffer memory 5.

In the encoder of this picture data transmission side, firstly, input analog video signals are digitized by the A/D converter 1, and are then TDM formatted by the TDM unit 2, so that brightness signals are paralleled in three channels. On the other hand, chrominance signals are arranged in line sequence, and are converted to four parallel input picture data together with the brightness signals. In the motion adaptive picture encoder 3, a motion compensation unit 7 performs motion compensation between the input picture data, which is time division multiplexed (TDM) by the TDM unit 2, and the data of the previous frame. According to the results, in the DCT unit 8 remainder data or the data of the current field is discrete cosine transformed (DCT), and the DCT coefficients are quantized by a quantizer 9 and are then output. The quantized data of DCT coefficients quantized by this motion adaptive picture encoder 3 is variable length coded by the variable length encoder 4, and is then sent out from the buffer memory 5 through the line interface 6. The buffer memory 5 serves to smooth the rate, and controls an amount of information to be coded by feedbacking control signals according to amounts of stored data to the motion adaptive picture encoder 3 and the variable length encoder 5.

Figure 2:
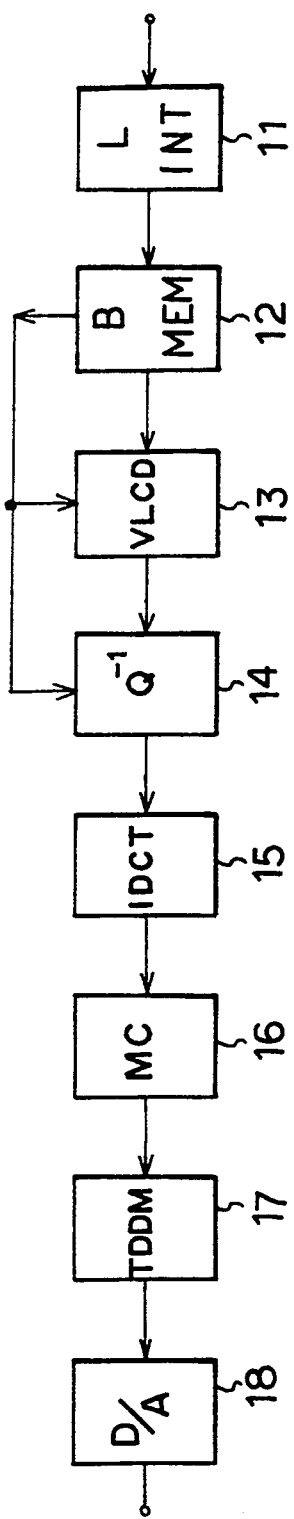
FIG. 2 is a block diagram illustrating the configuration of the receiving side of the same picture data transmission system.

In this picture transmission system, a decoder of the picture data receiving side, of which functional blocks are shown in FIG. 2, consists of the following: a line interface 11 for receiving picture data that is, quantized data of DCT coefficients which are transmitted from an encoder, as previously described, through the line interface 6; a buffer memory 12 for storing the quantized data of DCT coefficients received through this line interface 11; a variable length decoder 13 for variable length decoding the quantized data of DCT coefficients stored in this buffer memory 12; an inverse quantizer 14 for inverse quantizing the quantized data of DCT coefficients variable length decoded by the variable length decoder 13; an inverse DCT unit 15 for inverse discrete cosine transforming (DCT) the inverse quantized data of DCT coefficients inverse quantized by this inverse quantizer 14; a motion compensation to the inverse discrete cosine transformed picture data by inverse DCT unit 15; a time division de-multiplexing (TDDM) unit 17 for resolving time division multiplexing of the picture data motion compensated by the motion compensation unit 16 and rearranging the data in the original signal sequence; and a digital/analog (D/A) converter 18 for converting the picture data, placed back in the original signal sequence by TDDM unit 17, to analog data. The decoder of this picture data receiving side performs processing reversely to the encoder of the picture data transmission side and reproduce analog video signals from received quantized data of DCT coefficients and outputs them.

Figure 3:
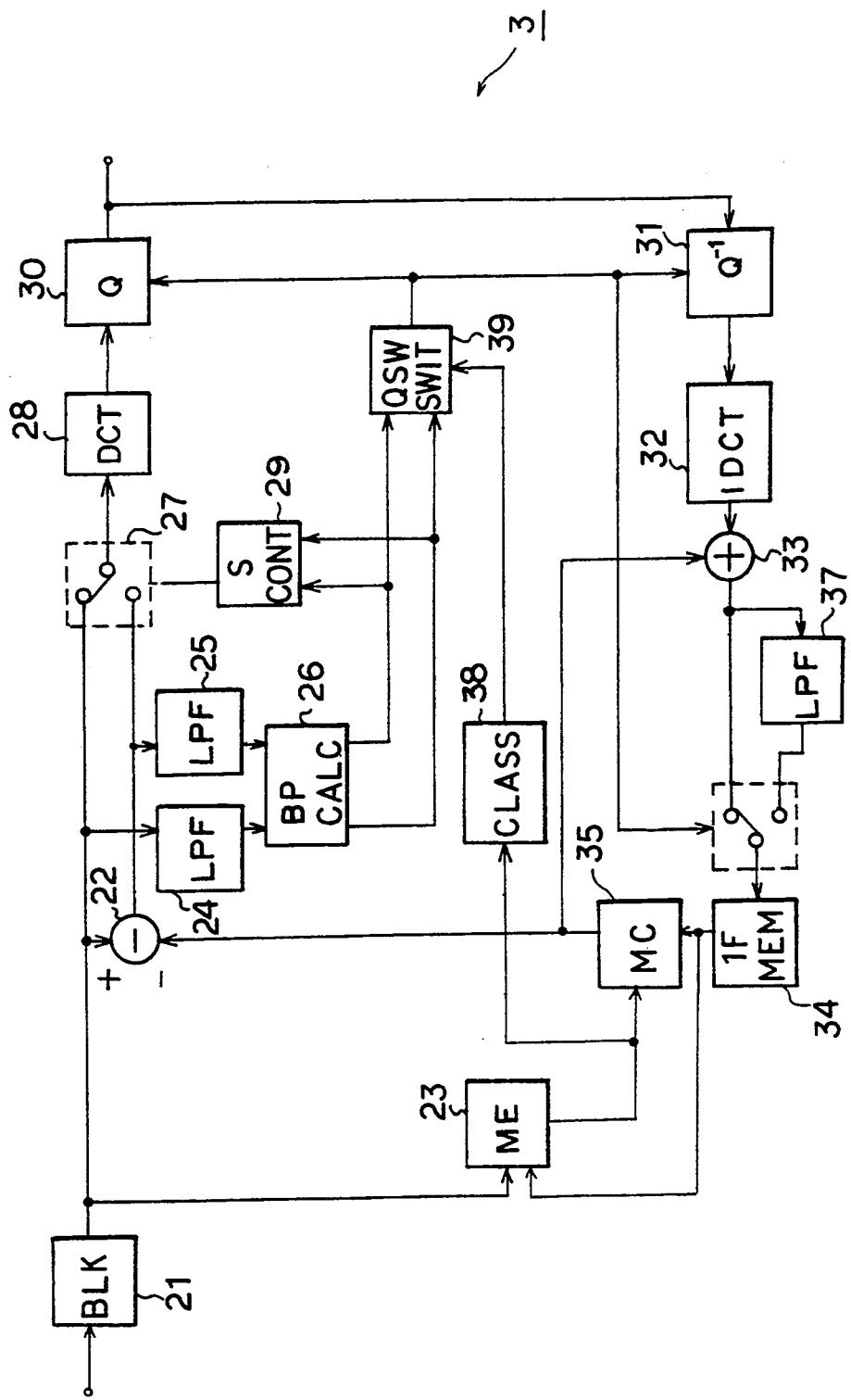
FIG. 3 is a block diagram illustrating the detailed configuration of the motion adaptive picture encoder shown in FIG. 1.

In the encoder of the picture data transmission aspect of the present invention, the motion adaptive picture encoder 3 is a motion adaptive picture encoder of the present invention, and a specific configuration thereof is shown in FIG. 3.

The motion adaptive picture encoder 3 includes a blocking unit 21 which is provided from the TDM unit 2 with input picture data time division multiplexed (TDM) in a raster scanning sequence. The blocking unit 21 divides the input picture data of the raster scanning sequence into blocks, each block consisting of 8 × 8 blocks in space arrangement, and then time series transforms the data in the block sequence. The picture data blocked by the blocking unit 21 is supplied to a differential detection unit 22 and a motion estimation unit 23. In the differential detection unit 22, a difference between the previous frame picture data and the input picture data, blocked by the blocking unit 21, is detected, thereby the previous frame picture data having been motion compensated by a motion compensation unit 35, which will be described hereinafter, on the basis of a motion vector detected by the motion estimation unit 23. In the motion estimation unit 23, the motion vector is computed from the previous frame picture data and the input picture data.

Furthermore, the motion adaptive picture encoder 3 is provided with the following: a block power calculation unit 26 which is supplied with picture data that is blocked by the blocking unit 21 and supplied through a low-pass filter 24, and which is fed with differential data that is detected by the differential detection unit 22 and supplied through a low-pass filter 25; a DCT unit 28 which is supplied with picture data that is blocked by the blocking unit 21, and differential data that is detected by the differential detection unit 22 and supplied through a switch 27; and a switch control unit 29 for controlling switching of the switch 27 on the basis of a detection output from the block power calculation unit 26.

The block power calculation unit 26 computes a block power BI of picture data, which is fed from the blocking unit 21 through the low-pass filter 24, and further calculates a block power BZ of the differential data supplied from differential detection unit 22 through the low-pass filter 25. The switch control unit 29 performs switch control of the switch 27 so that: when block powers BI and BZ calculated by the block power calculations unit 26 are $$BI > BZ \quad (1)$$

the switch is placed in an interframe DCT mode in which the differential data detected by the differential detection unit 22 is supplied to the DCT unit 28; and when $$BI \leq BZ \quad (2)$$

then the switch is placed in an intrafield DCT mode in which picture data from the blocking unit 21 is fed to the DCT unit 28.

In the interframe DCT mode, differential data detected by the differential detection unit 22 is discrete cosine transformed by the DCT unit 28, whereas in the intrafield DCT mode, picture data blocked by the blocking unit 21 is discrete cosine transformed by the DCT unit 28.

Moreover, the motion adaptive picture encoder 3 is provided with the following: a quantizer 30 which is fed with DCT coefficients of the picture data of each block that has been discrete cosine transformed by the DCT unit 38; an inverse quantizer 31 which is supplied with quantized data of DCT coefficients quantized by quantizer 30; and an inverse DCT unit 32 which is supplied with DCT coefficients of the picture data inverse quantized by the inverse quantizer 31. The quantizer 30 quantizes DCT coefficients of the picture data of each block that has been discrete cosine transformed by the DCT unit 28, and feeds the quantized data to the variable length encoder 4 and the inverse quantizer 31. The inverse quantizer 31 inverse quantizes the quantized data of DCT coefficients previously quantized data by the quantizer 30. The inverse DCT unit 32 inverse discrete cosine transforms the DCT coefficients of the picture data that has been inverse quantized by the inverse quantizer 31.

Furthermore, the motion adaptive picture encoder 3 includes a one frame memory 34 and a motion compensation unit 35. The one frame memory 34 is supplied with picture data, which is inverse discrete cosine transformed by the inverse DCT unit 32, and supplied through adder 33, whereas the motion compensation unit 35 conducts motion compensation on the picture data, which is stored in the one frame memory 34 on the basis of a motion vector detected by the motion estimation unit 23. The adder 33 adds picture data, which is inverse discrete cosine transformed by the inverse DCT unit 32, to picture data motion compensated by the motion compensation unit 35, and supplies the resulting sum data as the previous picture data to the one frame memory 34. The picture data from the adder 33 is supplied to the one frame memory 34 directly or through a low-pass filter 37 by selection of a switch 36 which is controlled by a control flag from the quantizer 30. The low-pass filter 37 effects low-pass filtering process to three pixels of the picture data with the x and y direction borders, as centers thereof.

Furthermore, the motion adaptive picture encoder 3 is provided a classifying unit 38 is supplied a motion vector detected by the motion vector detector, a quantizing step width control unit 39 which adaptively changes each quantizing step of the quantizer 30 and the inverse quantizer 31 on the basis of the classified result from the classifying unit 38 and the power of respective blocks calculated by the block power calculation unit 26, and so on.

Figure 4:
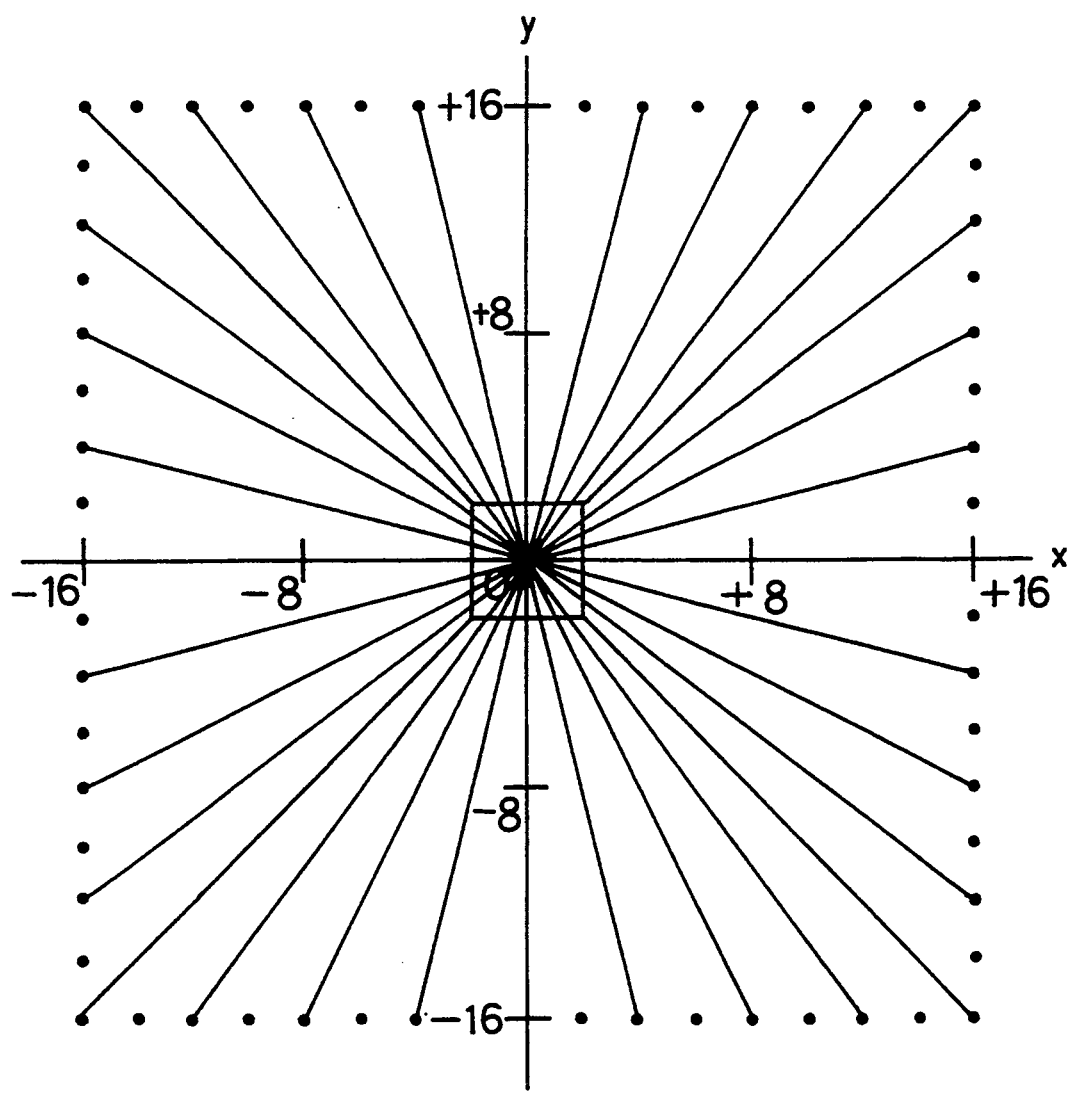
FIG. 4 is a graph illustrating the content of the motion vector classification of the classifying unit in the motion adaptive picture encoder shown in FIG. 3.

In the classifying unit 38, as shown in FIG. 4, classification is performed on the basis of absolute values and inclinations of motion vectors MVx and MVy computed in the motion estimation unit 23. More specifically, one class is particularly assigned to motion vectors of which the absolute values of motion vectors MVx and MVy are equal to the value of 2 or less and are very small in both directions whereas the remaining 33 classes are allotted to the other vectors according to inclinations and directions thereof. At this stage, if motion vectors are determined exactly to actual movements, then a vector correlation exists between a target block and adjacent blocks. In such a case, the blocks become equal in class. On the other hand, in the case where motions are so fast as to exceed the motion vector search range, it becomes meaningless to match within a search range. If a motion vector is to be determined in spite of this, then a vector having a minimum distortion within the search range is found. However, this has no relationship with the actual motion, and if a vector correlation is determined between the blocks, then the class becomes random. This is also the case in which a motion is so fast as to draw a tail.

In this classifying unit 38, the following mode assignment procedure (MAP) is performed.

In the mode assignment procedure (MAP), first the classes of the current block and adjacent blocks are determined. When these blocks are in the same class, they are considered relatively slow in motion and are matched within the search range. On the contrary, when these blocks are not equal in class, they are judged to be relatively fast in motion.

More specifically, as illustrated in FIG. 5A, the classes of the current block BLo and the block BLx in the x direction are compared. If they are equal in class, a logic "1" is set at the corresponding block position on the Q_step plane. If they are not equal in class, a logic "0" continues at the corresponding block position on the Q_step plane. This procedure is continuously executed for one field.

Subsequently, as shown in FIG. 5B, the classes of the current block BLo and the block BLy in the y direction are compared. If they are equal in class, a logic "1" is set at the corresponding block position on the Q_step plane. If they are not equal in class, a logic "0" continues at the corresponding block position on the Q_step plane. This procedure is continuously executed for one field.

The Q_step place is formed in such a fashion.

Then, inclusion of irregular blocks are performed. In detecting motion vectors MVx and MVy, irregular blocks are determined by comparing a target block with its surrounding blocks to discover noise distortions. In this mode assignment procedure (MAP), the irregular blocks are suppressed.

More specifically, as shown in FIG. 6A, where an isolated block BLxo is held between blocks of the other mode in the x direction in the Q_step plane, the block is included in the opposite side blocks reversing the mode thereof. Similarly, as shown in FIG. 6B, where an isolated block BLyo is held between blocks of the other mode in the y direction, the block is included in the opposite side blocks by reversing the mode thereof.

More specifically, if a block has a small remainder power is placed in a fast motion region in the Q_step plane, the quantizing step width becomes rough, and as a result, the block may appear distorted in a reproduced picture. To avoid this Q_step plane is corrected according to the remainder power In the quantizing step width control unit 39, the quantizing step width is selected from the quantizing step width table according to the Q_step plane obtained in classifying block 38. Thus, the quantizing step width of each of the quantizer 30 and inverse quantizer 31 is adaptively varied.

When a picture is divided into very fast blocks and the relatively slow blocks the regions which are visually important are the still regions or relatively slow regions, and blocks corresponding to these regions are capable of coding having a good fidelity. On the other hand, very fast blocks are not necessarily faithfully coded in view of its relative visual unimportance. In other words, they may be roughly quantized so that even a small amount of information may be adapted so as not to produce fatal deterioration in picture quality in the reproduced picture.

When a plurality of Q_step planes are provided not only on the basis of fast and slow motion modes but also motion compensation (MC) remainder power, the width of adaption can be increased.

It is to be noted that in addition to component signals of HDTV, 4:2:2, etc., composite signals of current NTSC, PAL, SECAM, etc. may be similarly processed as input picture data if converted to component signals.

In the motion adaptive picture encoder of the above embodiment, blocked picture data is classified according to the motion vectors of their respective blocks of regions. Whether the blocks of regions comprises of motions that are fast in the vector place or the blocks of regions comprises of motions that are slow in vector plane, motion adaptive quantization different bit assignment is conducted for blocks of each region. Therefore, the above embodiment is capable of achieving low rate coding and may be applied to visual communication applications through transmission medias, such as optical fibers and CATV, at a lower rate. For example, it is possible to compress and send HDTV signals using networks already built. Furthermore, in storage medias, such as digital VTR (video tape recorder) and CD-ROM, it becomes possible to store a larger capacity than usual.

Division of fast motion regions and a slow motion regions are made using motion vectors and thereby the regions are adaptable to the traceability of the viewer's eyes. Moreover, during motion adaptive quantization, rough quantization is made to fast motions, whereas fine quantization is conducted on slow motions. Thus, an amount of information saved in fast motion regions may be given to still or slow motions regions, and thereby a visual improvement in picture quality may be made. For example, it is possible to avoid a rapid increase in the amount of information when rapid panning of a camera is made.

Second Embodiment

Figure 7:
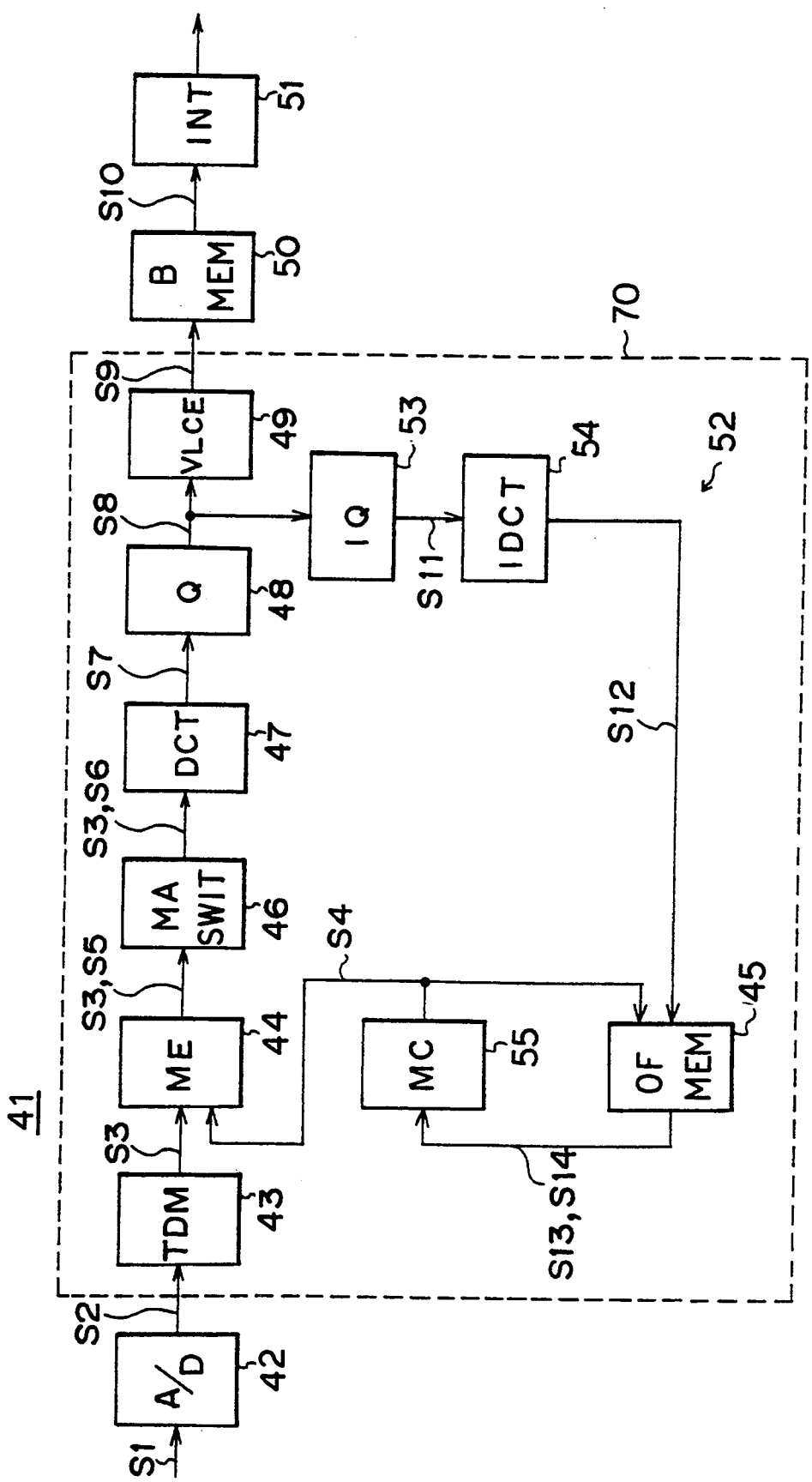
FIG. 7 is a block diagram illustrating an overall configuration of second embodiment of the motion picture coding system according to the present invention.

In FIG. 7, a numeral 41 depicts a motion picture coding system according to a second embodiment of the invention. Analog video signals S1 representing a motion picture are supplied to an analog/digital (A/D) conversion circuit 42, where the signals are converted to digital date S2. The digital data S2 consists of brightness signals Y and chrominance signals Pb and Pt. Additionally, the A/D conversion circuit 42 includes a matrix circuit. The data S2 is supplied to a time division multiplexing (TDM) circuit 43.

In the time division multiplexing circuit 43, each frame is divided and the brightness signals Y are separated into N-1 channels and the chrominance signals Pb and Pr are combined in one channel by arranging them in line sequence. The brightness signals Y and the chrominance signals Pb and Pr together form independent N channel input data S3 and are supplied to motion estimation (ME) circuit 44. According to circumstances, the time division multiplexing circuit 43 may send the brightness signals Y and the chrominance signals Pb and Pr in a time division multiplex format.

The motion estimation circuit 44 computes a motion vector S5 based on both the input data S3, including brightness signals Y and the chrominance signals Pb and Pr, and the previous frame data S4 stored in overlapping/frame memory 45. This vector is supplied to motion adaptive switching circuit 46 together with the input data S3.

The motion adaptive control circuit 46 performs a compensation between the input data S3 and the previous frame data S4, and according to the result, makes a selection as to whether the remainder data S6 or the input data S3 of the current field is supplied to discrete cosine transformation (DCT) circuit 47. Furthermore, the motion adaptive control circuit 46 conducts a motion classification using the motion vector, reflects the quickness of the motion on a Q_step plane, and thereby sends information of the motion vector and the Q_step plane to quantization circuit 48.

The discrete cosine transformation circuit 47 performs independent discrete cosine transforming (DCT) of parallel N channel remainder data S6 or the input data S3 of the current field. The resulting DCT coefficient data S7 is supplied to the quantization circuit 48. As a result, adaptive quantization of the DCT coefficient data S7 is achieved based on the information of the Q_step plane, the block remainder power, etc.. This quantized data S8 is sent to variable length coding encoder 49.

The variable length coding encoder 49 performs variable length coding of the quantized data S8 and the resulting coding data S9 is accumulated in a buffer memory 50 for rate smoothing.

To smooth the amount of information which varies as time passes at a predetermine rate, the buffer memory 50 controls the amount of information data to be coded according to the accumulation of data in the buffer memory 50, and consequently, the buffer memory 50 feedbacks a control signal to the quantization circuit 48 and the variable length coding circuit 49. The motion picture coding data S9 which is accumulated in the buffer memory 50 is sequentially read out, and is sent out as output data S10 through a line interface 11 for transmission or accumulation.

This motion picture coding system 41 has a local decoding system 52 incorporated in it for performing motion compensation between the input data S3 of the current frame and the previous frame data S4. The local decoding system 52 is constituted by an inverse quantization circuit 53, an inverse discrete cosine transformation circuit 54, the overlapping/frame memory 45, and a motion compensation circuit 55.

The inverse quantization circuit 53 inverse quantizes the quantized data supplied from the quantization circuit 48 to produce inverse quantized data S11. This inverse quantized data S11 is inverse discrete cosine transformed in the inverse discrete cosine transformation circuit 54, and is then accumulated as local decoded data S12 in the overlapping/frame memory 45. In the overlapping/frame memory 45, brightness signals Y data is overlapped between the adjacent channels of the divided picture.

The motion compensation circuit 55 performs motion compensation by adding shifted data to the remainder data S14 that has been inverse discrete cosine transformed. The shifted data is obtained by shifting the picture data S13 in the frame memory according to the motion vector. Further, the motion compensation circuit 55 updates the contents of the overlapping/frame memory 45.

In such a manner, in the motion picture coding system 41, video signals of input motion pictures are divided into a plurality of channels for one field and the resulting independent N channel digital data comprising the brightness signals Y and the chrominance signals Pb and Pr is motion compensated with DCT in a parallel manner, as well as adaptively quantized. The video signals are efficiently coded with a high processing speed.

Figure 8:
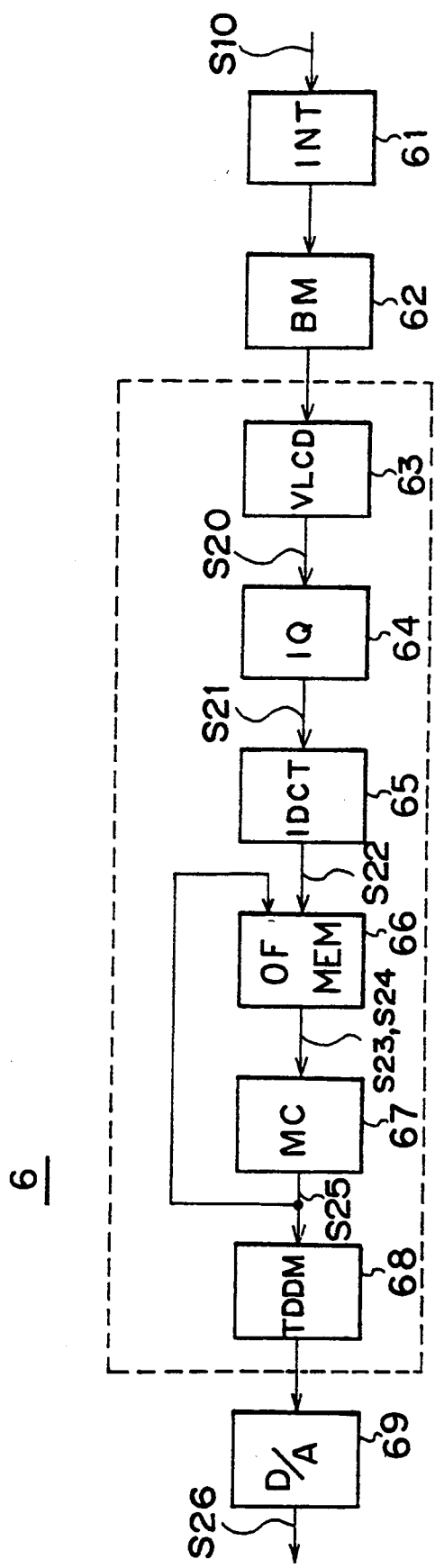
FIG. 8 is a block diagram showing an overall configuration of the second embodiment of the motion picture decoding system according to the present invention.

In FIG. 8 numeral 60 depicts a motion picture decoding system which decodes motion picture coded data S10 coded by the motion picture coding system 41. In the motion picture decoding circuit 60, the decoding processing flows in the opposite path with respect to the encoding processing of the motion picture coding systems 41 of FIG. 7, and performs the same function as the local decoding system 52 in the motion picture coding system 41 of FIG. 7.

More specifically, the motion picture coded data S10, supplied from a transmission line or the like through line interface 61, is temporarily accumulated in buffer memory 62, and is then sequentially read out and supplied to variable length coding decoder 63.

The buffer memory 62 inputs control signals to the variable length decoding circuit 63 and the inverse quantization circuit 64 to smooth a time varying amount of information of the motion picture coded data S10 to a predetermined rate.

In the variable length decoding circuit 63, the input motion picture coded data S10 is variable length decoded in a opposite manner to the variable length coding method of the motion picture coding system 41, and the resulting variable length decoded data S20 is sent to inverse quantization circuit 64.

The inverse quantization circuit 64 inverse quantizes the variable length decoded data S20 and sends out the resulting inverse quantized data S21 to inverse discrete cosine transformation circuit 65. The inverse discrete cosine transformation circuit 65 inverse discrete cosine transforms the inverse quantized data S21, and the resulting inverse discrete cosine transformation data S22 is accumulated in an overlapping/frame memory 66. In the overlapping/frame memory 66, the brightness signals Y data is overlapped between the adjacent channels.

The motion compensation circuit 67 performs motion compensation by adding shifted data to the remainder block data S24 that has been inverse discrete cosine transformed. The shifted data is obtained by shifting a picture data S23 in the frame memory 66 according to the motion vector. Further, the motion compensation circuit 67 updates the contents of the overlapping/frame memory 66. The resulting motion picture data S25 is sent to time division demultiplexing circuit 68.

In the time division demultiplexing circuit 68, the brightness signals Y and the chrominance signals Pb and Pr in the motion picture data S25 are converted from the block unit to the original signal sequence. The parallel processing previously performed on brightness signals Y is changed back to the original single channel processing of N times speed, whereas the line sequential format previously performed on the chrominance signals Pb and Pr, is converted back to the original formats. In digital analog (D/A) conversion circuit 69, the brightness chrominance signals are digital to analog converted and the resulting analog video signals S26 are sent out as motion picture decoded data which is an output of the motion picture decoding circuit 60.

Figure 9:
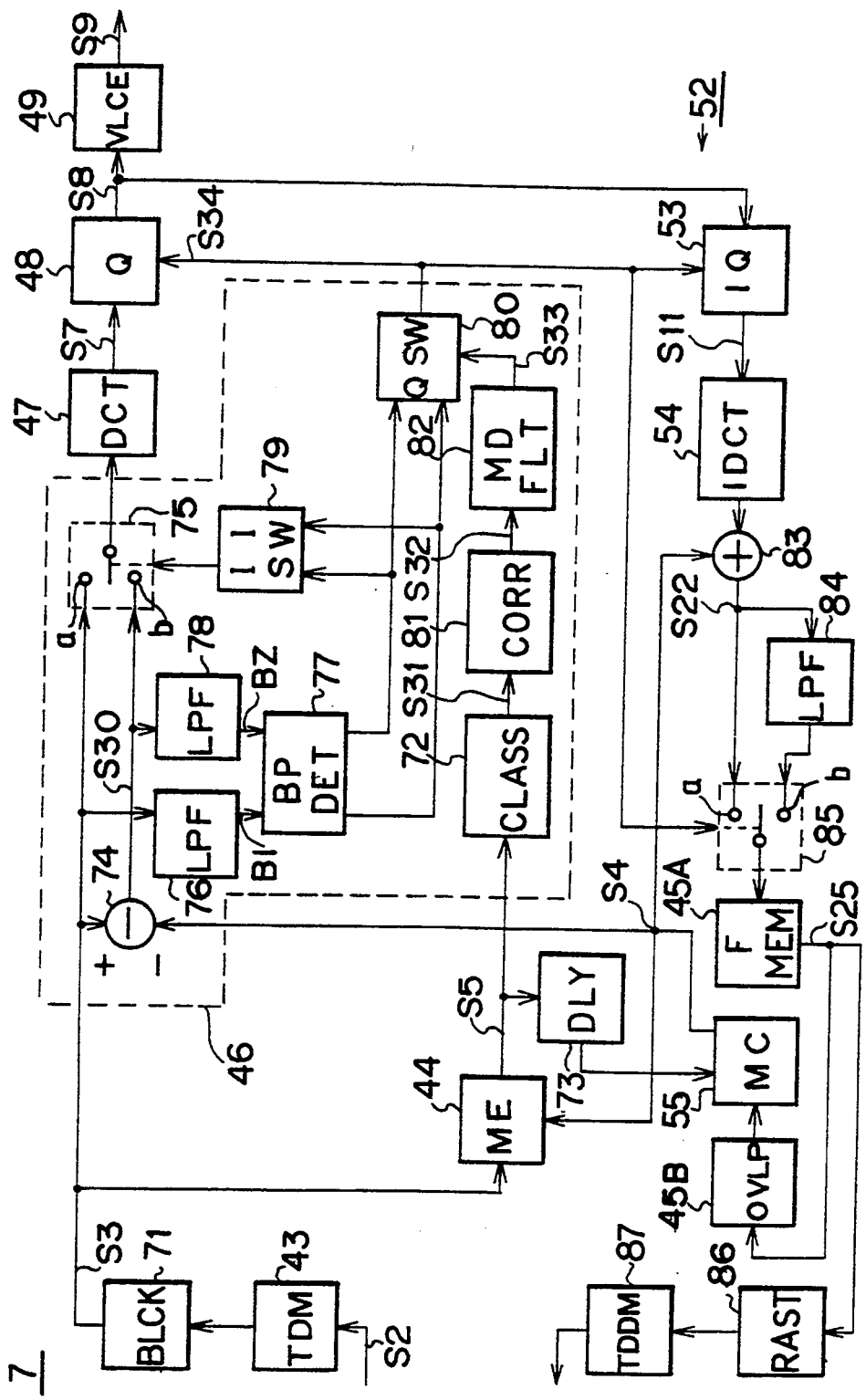
FIG. 9 is a block diagram showing the detailed configuration of the motion picture encoding system shown in FIG. 7.

In FIG. 9, in which parts corresponding to parts of FIGS. 7 and 8 are given the same reference numerals, numeral 70 depicts a motion picture processing apparatus which comprises the motion picture coding system 41 (FIG. 7) and the motion picture decoding circuit 60 (FIG. 8). Motion picture processing apparatus 70 includes a local decoder 52 for producing motion compensation difference between a previous frame and the current frame.

Analog video signals S1 which represent the input motion picture (not shown) are converted to digital data S2. In the time division multiplexing circuit 43, the brightness signals Y and the chrominance Pb and Pr are converted to digital data of N channels. In blocking circuit 71, the digital data in the raster scanning order is time series converted in the 8 × 8 block order, and supplied as input data S3 to the motion estimation circuit 44 and the motion adaptive control circuit 46.

The motion estimation circuit 44 computes a motion vector S5 on the basis of the input data S3 and the previous frame data S4 stored in the frame memory 45A (which composes part of the overlapping/frame memory 45). The previous frame data S4 is obtained through the overlapping circuit 45B (which composes part of the overlapping/frame memory 45) and the motion compensation circuit 55. This motion vector S5 is sent to classifying circuit 72 of the motion adaptive control circuit 46, as well as the motion compensation circuit 55, through a predetermined delay circuit 73.

The input data S3 to be input to the motion adaptive control circuit 46 is supplied to differential circuit 74 and first input terminal 'a' of selector circuit 75. In addition, the input data S3 is supplied to block power detection circuit 77 as data BI which has been passed through low-pass filter 76 to remove high frequency noise from each block.

The previous frame data S4 is supplied to the differential circuit 74 in addition to the input data S3. The resulting remainder data S30 is supplied to the second input terminal 'b' of the selector circuit 75, and is supplied to block power detection circuit 77 as data B2 which has been passed through a low-pass filter 78 to remove high frequency noise from each block.

The block power detection circuit 77 calculates the absolute sum of the data BI of the input data S3 and the data BZ of the remainder data S30. The absolute sum has the mean value of each block removed and is sent to intra/inter switching circuit 79 and quantization switching circuit 80.

The intra/inter switch circuit 79 computes a block power of the data BI of the input data S3 and the data BZ of the remainder S30. When the block power of the data BI and the data BZ has the following relationship, the intra/inter switch circuit 79 selects the first input terminal 'a' of selector circuit 75, so that the input data S3 is sent to the discrete cosine transformation circuit 47:

$$BI \leq BZ \quad (3)$$

On the contrary, when the block power of the data BI and the data BZ has the following relationship:

$$BI \leq BZ \quad (4)$$

the second input terminal 'b' of the selector circuit 75 is selected as an interframe DCT mode, so that the input data S3 and the remainder data S30 of the previous frame data S4 are sent to the discrete cosine transformation circuit 47.

Figure 10:
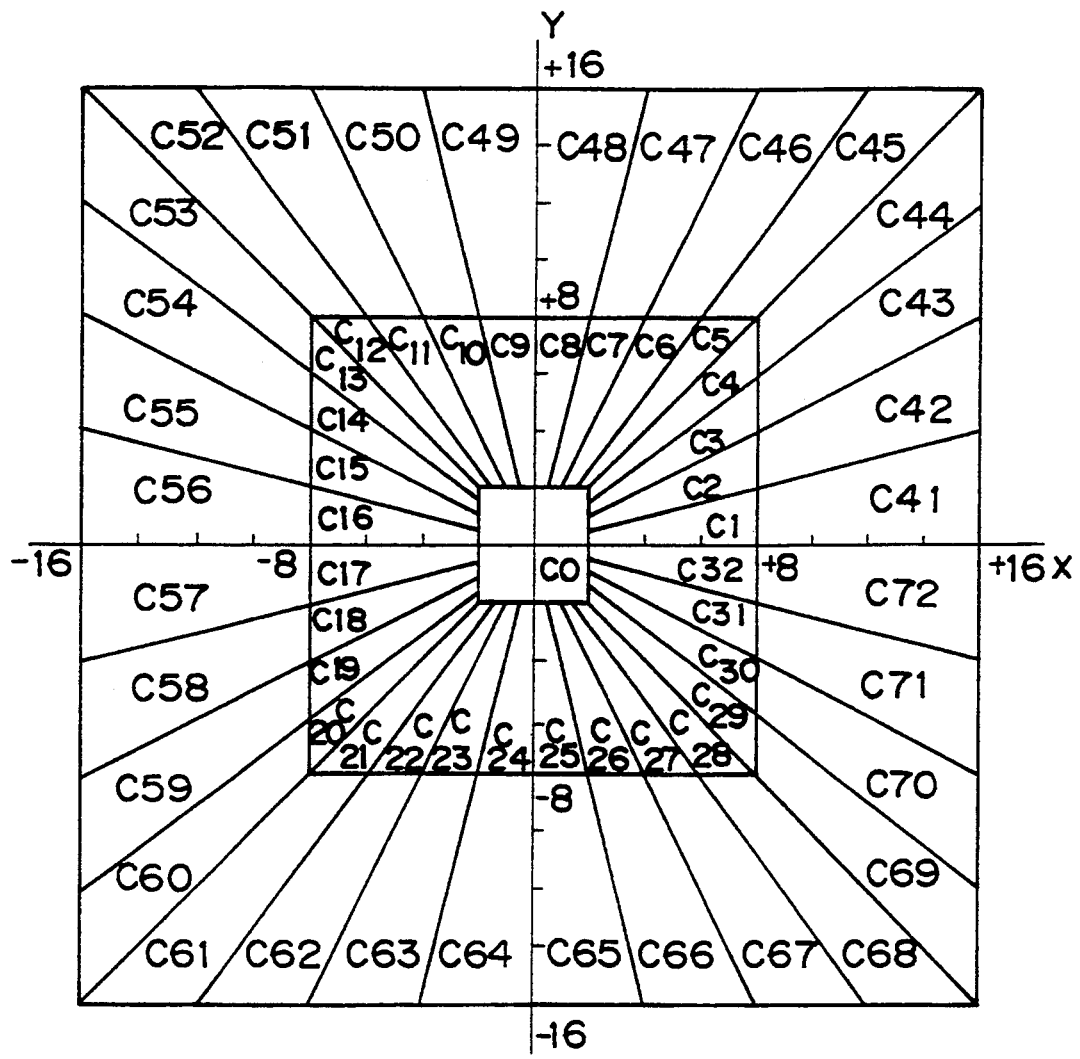
FIG. 10 is a diagrammatic view illustrating the classifying map for performing processes in the motion picture encoding system of FIG. 9.

In the classifying circuit 72, when the interframe DCT mode is selected, as shown in FIG. 10, classification is conducted according to the absolute value and the inclination of the motion vector S5 (MVx, MVy) calculated in the motion estimation circuit 44.

In the classifying map of FIG. 10, the x-coordinate and the y-coordinate are values of the motion vector S5 (MVx, MVy) in x and y directions, respectively. In practice, a class C0 is formed for vectors S5 (MVx, MVy) having an absolute value of the motion smaller than 2 in either direction motion vectors having an absolute value of the motion from 2 to 8, 32 classes C1-C32 are formed according to respective directions of the vectors.

Moreover, 32 classes C41-C72 are formed for motion vectors S5 (MVx, MVy) having an absolute value of the motion from 8 to 16. Motion vectors S5 (MVx, MVy) of the blocks are classified to 65 classes C0-C32 and C41-C72.

Accordingly, a selected width is formed so that global correlationships in an area, including adjacent blocks, may be made to some extent since a very small partial difference between vectors, according to a pattern, cannot be absorbed when correlationships are made according to the inclination and magnitude of the motion vectors S5 (MVx, MVy). A class S31 (C0, C1-C32, C41-C72) obtained about a motion vector S5 (MVx MVy) of each block, is supplied to correlation circuit 81.

Figures 11A, 11B:
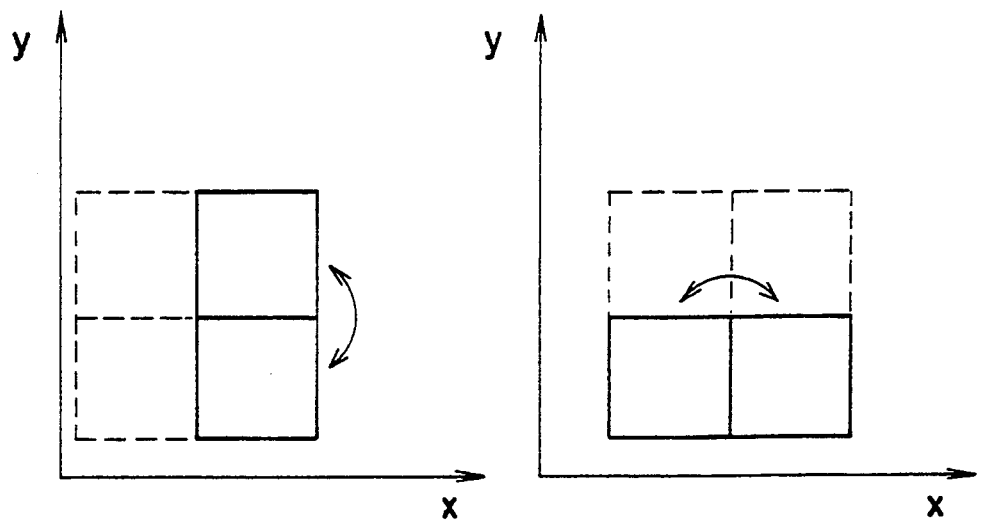
FIGS. 11A and 11B are diagrammatic views illustrating formation of the Q-step plane for performing processes in the motion picture encoding system of FIG. 9.

As shown in FIGS. 11A and 11B, the correlation circuit 81 compares class S31 (C0, C1-C32, C41-C72) which is made between a block under processing and each of the adjacent blocks, and when they are equal in class S31, the Q_step flag is set to a logic "1". These blocks are called "relatively slow blocks" which are matched within the searched range.

On the other hand, when the motion of the blocks is too fast and exceeds the search range of the motion vector S5 (MVx, MVy), matching the blocks is inconsequential. In the case where motion vector S5 (MVx, MVy) is obtained in spite of this, a block within the search range having a minimum absolute sum of the block difference must be found.

However, this has no relationship with the actual motion vectors. When the correlation of motion vector S5 (MVx, MVy) between blocks is made, the class S31 becomes random. This is also the case in which the motion is so fast, that a tail thereof is drawn. In such a case, the Q_step flag is set to logic "0". In this fashion, a Q_step plane S32 is formed.

Figure 13:
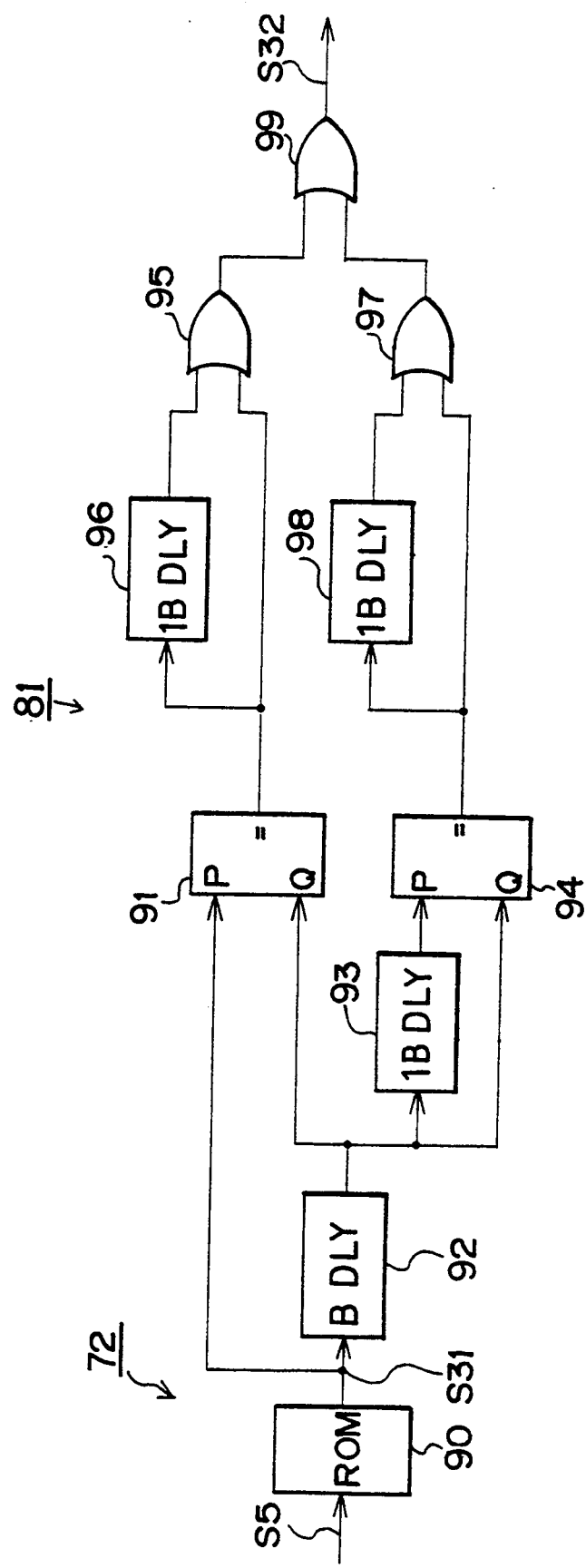
FIG. 13 is a block diagram showing configurations of the classifying circuit and the correlation circuit in the motion picture encoding system of FIG. 9.

In this embodiment, the classifying circuit 72 and the correlation circuit 81 are constructed, as shown in FIG. 13. The motion vector S5 (MVx, MVy) is fed to a ROM 90 which stores the classifying map of FIG. 10 corresponding to the classifying circuit 72, and as a result a class S31 (FIG. 14A), according to the motion vector S5 (MVx, MVy) is output.

This class S31, is supplied to a first input terminal 'P' of first comparison circuit 91 and to second input terminal Q through block delay circuit 92. S31, which is delayed in the block delay circuit 92, is supplied to first input terminal 'P' of second comparison circuit 94 through one block line delay circuit 93 and is also supplied to second input terminal 'Q'.

The first comparison circuit 91 outputs a value of logic "1" when the class S31 has a lateral correlation. This value is directly supplied to a first OR circuit 95 and is also supplied to the first OR circuit 55 through a one block delay circuit 96.

The second comparison circuit 94 outputs a value of logic "1" when the class S31 has a vertical correlation.

This value is directly supplied to a second OR circuit 97 and is also supplied to the second OR circuit 97 through a one block line delay circuit 98.

Each output of the first and second OR circuit 95 and 97 are supplied to a third OR circuit 99. Third OR circuit 99 operates in such a manner where a comparison is made to the x and y direction correlations of class S31. Using these correlation outputs, a Q_step plane S32 (FIG. 14B) is formed and is sent to majority decision filter 82.

In the case where in a two-dimensional plane in the Q_step plane S32, a mode of a block is surrounded with another mode of blocks and is isolated, the majority decision filter 82 corrects the Q_step plane by reversing the mode of the block, so that any irregular block in the Q_step plane S32 is exclude.

Figures 12A, 12B:
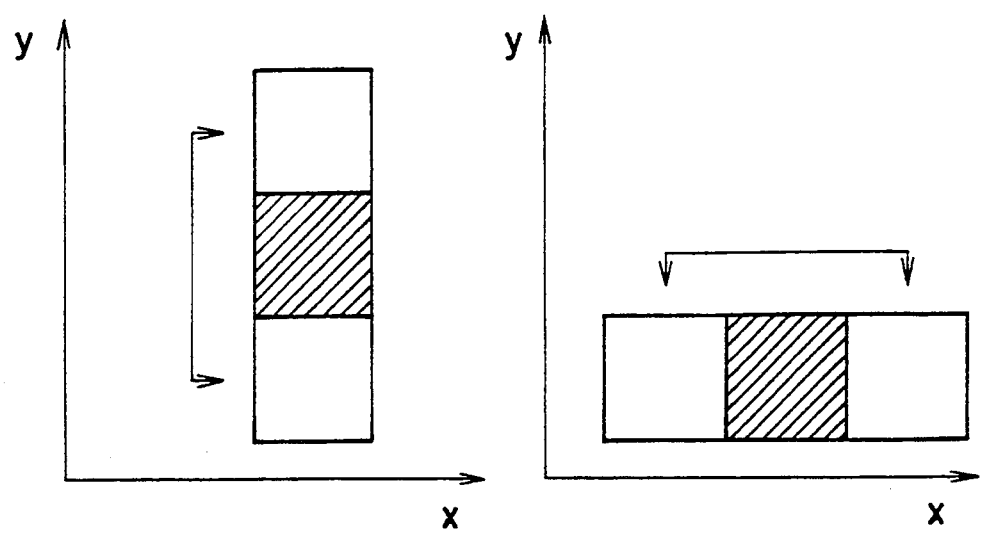
FIGS. 12A and 12B are diagrammatic views illustrating amendment of the Q-steps plane for performing processing in the motion picture encoding system of FIG. 9.

In detecting motion vector S5, an irregular motion vector, in relation to motion vectors of the surrounding blocks, can be detected due to edges and noises included in the picture. The mode of this irregular block is reversed to the mode of the surrounding blocks. More specifically, in the Q_step plane a mode of a block held in the north-south direction or the east-west direction is, as shown in FIGS. 12A and 12B, reversed.

The width of the step in quantization largely depends upon determining whether the motion is fast or slow. For this reason, it is possible to correct visual distortions between blocks by reversing the mode of an irregular block. The corrected Q_step plane S33 is sent to the quantization switch circuit 80.

Figure 15:
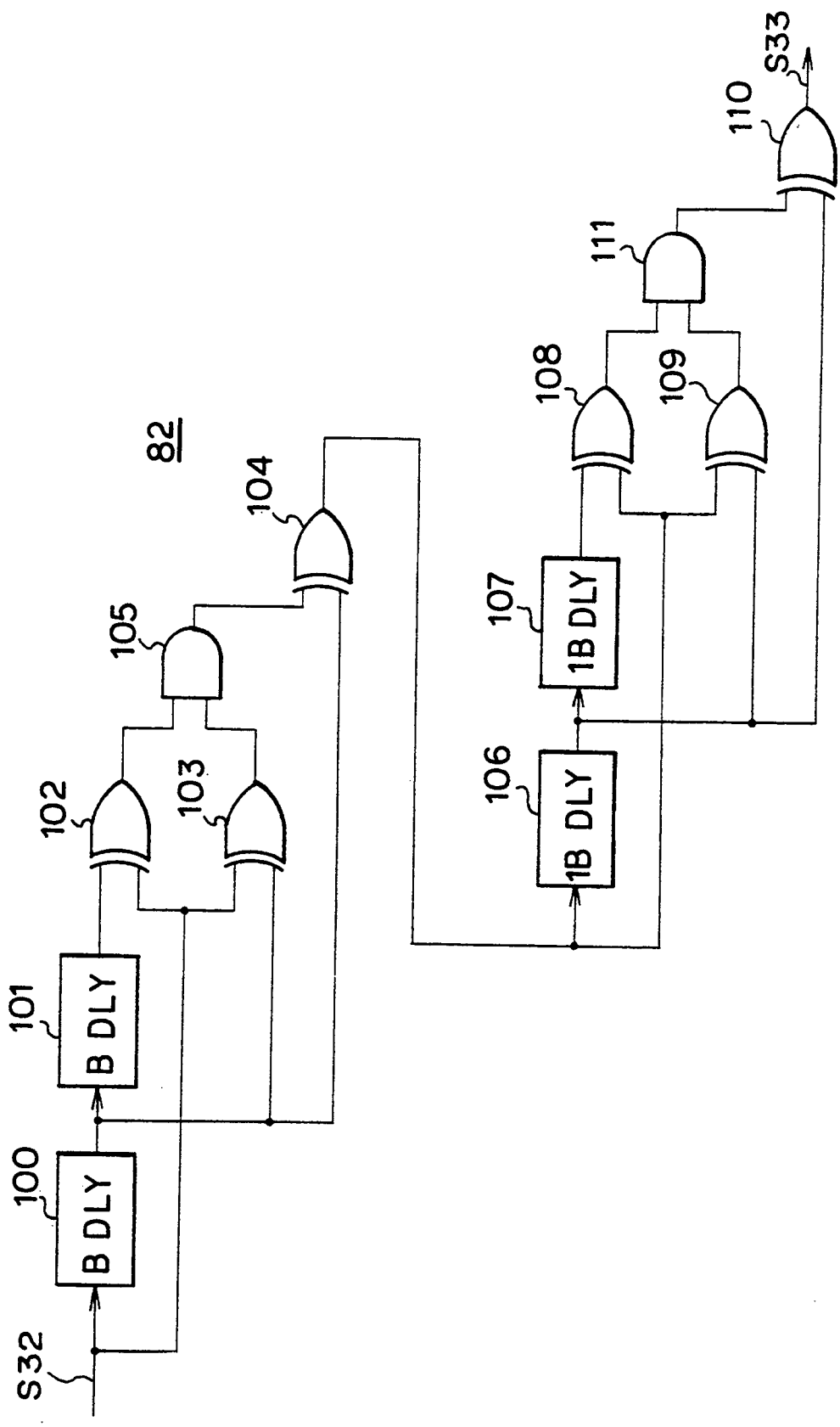
FIG. 15 is a block diagram showing configuration of the majority decision filter in the motion picture encoding system of FIG. 9.

In this embodiment, the majority decision filter 82, as shown in FIG. 15, comprises two block delay circuits 100 and 101, three OR circuits 102, 103 and 104, and an AND circuit 105, to compute an OR majority decision of the supplied block in the x direction.

Subsequently, another majority decision is computed by the OR in the y direction, combining two one block line delay circuits 106 and 107, three OR circuits 108, 109 and 110, and an AND circuit 111. In such a fashion, exclusion of irregular blocks in the Q_step plane S32 is achieved by majority decision. The resulting corrected Q_step plane S33 (FIG. 14C) is sent to the quantization switch circuit 80.

The quantization switch circuit 80 adaptively changes the quantization step width of the quantization circuit 48 in accordance with block powers derived from the input data S3 and the remainder data S30 in the block power detection circuit 77, and the Q_step plane S33 supplied from the majority decision filter 82.

More specifically, if small block power blocks of the remainder data S30 are placed in a fast motion region in the Q_step plane S33, then the quantization step width becomes large, and as a result the blocks may produce visual distortions as block strains in a reproduced picture. To avoid this, the Q_step plane S33 is corrected according to the power of the remainder data S30.

In the quantization switch circuit 80, the table of the quantization step width is referred to according to the determined Q_step plane S33, so that the quantization step S34 of the quantization circuit 48 is controlled. As a result, the DCT coefficient data S7 sent out from the discrete cosine transformation circuit 47 is quantized according to the quantization step S34. The resulting quantized data S8 is variable length coded in the variable length coding circuit 49, and is subsequently sent out.

This divides a picture into very fast blocks and relatively slow blocks. The regions which visually attract attention are the reactively slow regions (or still regions) and blocks corresponding to these regions may be coded with a good fidelity.

On the other hand, blocks of which motions are very fast are not necessarily faithfully coded since they are visually undetectable. Therefore, the very first region are roughly quantized, so that even a small amount of information may be adapted so as not to produce fatal deterioration in picture quality in the reproduced picture.

Referring back to FIG. 9, the motion picture processing apparatus 70, the quantized data S8 transmitted from the quantization circuit 48 is inverse quantized in the inverse quantization circuit 53 of the local decoding system 52, according to quantization step S34 sent from the quantization switch circuit 80. The resulting inverse quantized data S11 is supplied to the inverse discrete cosine transformation circuit 54.

The inverse quantized data S11 is subjected to inverse discrete cosine transformation in the inverse discrete cosine transformation in the inverse discrete cosine circuit 54, and is subsequently added to the previous frame data S4 in the adder circuit 83. The resulting decoded data S22, according to the input data S3, is supplied to a first input terminal a of a selector circuit 85 and a low-pass filter 84.

Regarding the decoded data S22, the low-pass filter 84 applies low-pass filtering to three pixels of the block borders in both the x and y directions, and then sends the data to the second input terminal 'b' of the selector circuit 85. Thus, the low-pass filter 84 reduces noise that occur with blocking in the reconstructed picture after decoding.

The selector circuit 85 is selectable to either the first input terminal 'a' or the second input terminal 'b' by a control flag that is sent from the quantization switch circuit 80, so that he decoded data S22, according to the input data S3, is stored in the frame memory 45A.

The decoded data S25 is read out from the frame memory 45A at a predetermined time and sent to the overlapping circuit 45B and the raster circuit 86. The raster circuit 86 converts the decoded data S25 from the 8 × 8 block sequence to the raster sequence, and supplies the converted data to the time division demultiplexing circuit 87.

In blocking and adaptive coding motion picture signals, the class of the motion vector of each block is determined, and then a majority decision is completed between the target block and the surrounding blocks. The class of each of the isolated (target) blocks is replaced by the class of the surrounding blocks, so that a motion picture coding apparatus is provided which is capable of preventing irregular classes from appearing and of effectively avoiding degradation in picture quality.

Although the embodiment described above is applied to a motion picture coding apparatus which codes television signals the present invention may be widely applied to picture processing apparatus in which pictures are divided in blocks and undergoes predetermined adaptive coding.

In addition, noises may be effectively removed by applying the majority decision means of the present invention to individual pixels of binary picture of facsimiles or the like, and dot-like-noises which are produced due to repeated copying, may be effectively removed by applying the majority decision means of the present invention to photocopiers or the like.

According to the second embodiment as described, adaptive coding is conducted according to a predetermined method including dividing a picture into blocks, computing a majority decision regarding a predetermined block in relation to its surrounding blocks, and replacing the isolated (predetermined) block by the surrounding blocks. Therefore, there is provided a picture processing apparatus which is capable of preventing degradation in picture quality due to occurrence of isolated blocks which is capable of enhancing picture quality as whole.

Third Embodiment

Third embodiment is a motion picture coding apparatus which codes motion picture signals, such as high definition television (HDTV) signals.

This apparatus is constructed as previously described in FIGS. 7 to 9.

Figure 16:
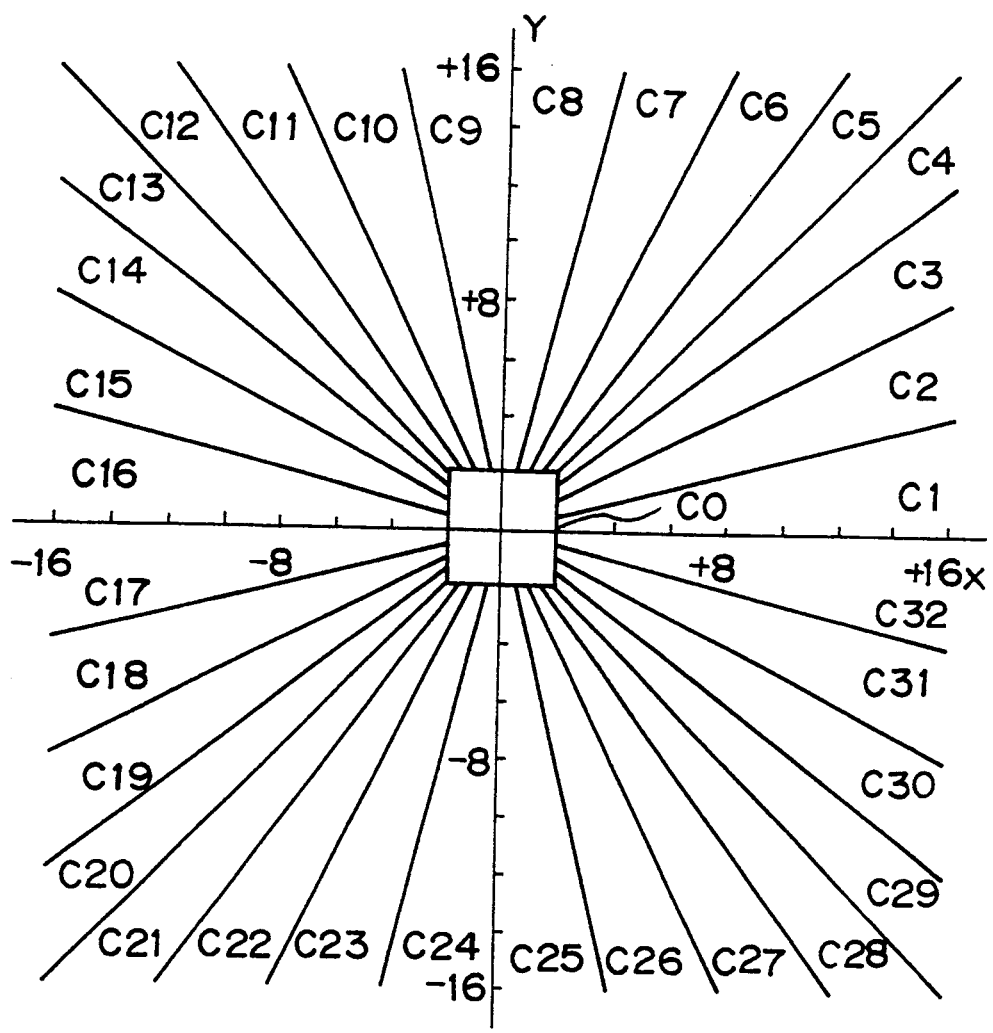
FIG. 16 is a diagrammatic view illustrating the classifying map which is processed in the third embodiment of the motion picture encoding system.

In the classifying circuit 72 (shown in FIG. 9) of this embodiment, as shown in FIG. 16, classification is conducted according to the absolute value and inclination of the motion vector S5 (MVx, MVy) that has been calculated in the motion estimation circuit 44.

In the classifying map of FIG. 16, the x-axis and y-axis indicate values of the motion vector MVx and MVy in x and y directions, respectively. A class CO is formed for small vectors S5 (MVx, MVy) each of which has an absolute value of the motion smaller than 2 in either direction. The remaining motion vectors classes, C1-C32, are formed according to their respective inclinations and directions thereof. Accordingly, blocks are classified to 33 separate classes (C0-C32).

At that stage if the motion vector S5 (MVx, MVy) is calculated exactly to the actual motion, than it is determined that there is a correlation between the target block and the surrounding blocks. In such a case, the blocks become equal in class C1-C32.

On the other hand, when the motion is too fast and exceeds the search range of the motion vector S5 (MVx, MVy), it becomes meaningless to match within a search range. If a motion vector S5 (MVx, MVy) is to be computed in spite of this, then a block of which the distortion strain is at minimum within the search range must be found.

However, this range has no relationship with actual motion. When a correlation of vectors between blocks is made, the selection of classes C0–C32 become random. The class selection is also random in the case in which the motion is so fast, so that a tail thereof is drawn. In such a case, the Q—step flag is set to logic "0".

Subsequently, as shown in FIGS. 11A and 11B in the MAP (mode assignment procedure) of the classifying circuit 72, a class C0-C32 is determined between the current block and its surrounding blocks, and thereby forms a Q—step plane S31.

In forming this Q—step plane S31, as illustrated in FIG. 11B, classes C0-C32 of the current block and the block in the x-direction are compared. If the classes C0-C32 are equal, then logic "1" is set at the corresponding block position on the Q—step plane S31. If the classes C0-C32 are not equal, then logic "0" remains at the corresponding block position on the Q—step plane S31. This procedure is continuously executed for one field.

Subsequently, as shown in FIG. 11B, classes C0-C32 of the current block and the block in the y-direction are compared. If the classes C0-C32 are equal, then logic "1" is set at the corresponding block position on the Q-step plane S31. If the classes C0–C32 are not equal, then logic "0" remains at the corresponding block position on the Q-step plane S31. This procedure is repeated for each filed. In such a fashion, the Q-step plane S31 is formed.

When classes C0–C32 of adjacent blocks are equal, these blocks are considered relatively slow in motion and are matched within a search range. On the contrary, when classes C0–C32 of adjacent blocks are not equal, these blocks are determined to be relatively fast in motion. This judgment is reflected on the Q-step plane S31.

Subsequently, in the map of the classifying circuit 72, the exclusion of irregular blocks are performed. In practice, irregular blocks, as compared to its surrounding blocks, can be determined by detecting the edges and noises in motion vectors MVx and MVy.

To avoid this, the classifying circuit 72 suppresses these blocks by reversing the mode of a block placed between north and south blocks (FIG. 12A) or east and west blocks (FIG. 12B) on the Q-step plane S31, as shown in FIGS. 12A and 12B.

More specifically, as shown in FIG. 12A, in the case where an isolated block is held between blocks of the other mode, the indicated block is included in the north and south blocks by reversing the mode thereof.

Furthermore, as shown in FIG. 12B, the same procedure is conducted in the x-direction, and isolated block between adjacent east and west blocks are reversed in mode, so that the blocks are combined in the east and west blocks. The Q-step plane S31 is corrected by combining irregular blocks in such a manner, and signal S31 is supplied to the quantization switching circuit 80.

The quantization switch circuit 80 adaptively changes the quantization step width of the quantization circuit 48 in accordance with block powers derived from the input data S3 and the remainder data S30 in the block power detection circuit 77, and the Q-step plane S31 supplied from the classifying circuit 72.

More specifically, if a block of which block power of the remainder data is small is placed in a fast motion region in the Q-step plane S31, then the quantization step width becomes large, and as a result the block may produce visual distortions as block strains in a reproduced picture. To avoid this, the Q-step plane S31 is corrected according to the power of the remainder data.

In the quantization switch circuit 80, the table of the quantization step width is referred to according to the determined Q-step plane S31, so that the quantization step S32 of the quantization circuit 48 is controlled. As a result, the DCT coefficient data S7 sent out from the discrete cosine transformation circuit 47 is quantized according to the quantization step S32. The resulting quantized data S8 is variable length coded in the variable length coding circuit 49, and is subsequently sent out.

This divides a picture into very fast blocks and relatively slow blocks. The regions which visually attract attention are the relatively slow regions (or still regions) and blocks corresponding to these regions may be coded with a good fidelity.

On the other hand, blocks of which motions are very fast are not necessarily faithfully coded since they are virtually undetectable. Therefore, the very fast regions are roughly quantized, so that even a small amount of information may be adapted so as not to produce fatal deterioration in picture quality in the reproduced picture. When a plurality of Q-step planes are provided on the basis of not only the fast and slow motion modes but also block powers of remainder data, the width of adaptation can be increased.

In the motion picture coding apparatus 41 of the third embodiment previously described, the brightness signals Y are parallel processed in N-channels by the division of a picture in the time division multiplexing circuit 43, motion vectors MVx and MVy are calculated using the stored data of the previous frames, and the correlation of vectors are used as means for achieving adaption to motion. In the case where a motion vector exceeds the search range thereof because of excessively fast motion, a vector of which strain distorts is at a minimum within the search range is determined so that a vector irrespective of the motion can be computed.

Border portions of N-channels which are produced by the division of a picture, follows the same process as described above. More specifically, regarding the motion of a picture which crosses the border portions of the channels, the motion vector MVx and MVy of each channel is not provided with the same search range as in other portions of the block, with the exception of the border portions.

In the case where the motion of the whole picture is relatively slow, the motion vectors are in the same direction, however, in the border portions, the directions of the vectors become random. In the Q-step plane which is calculated in the classifying circuit 72, the motion is therefore presumed fast.

Figure 17:
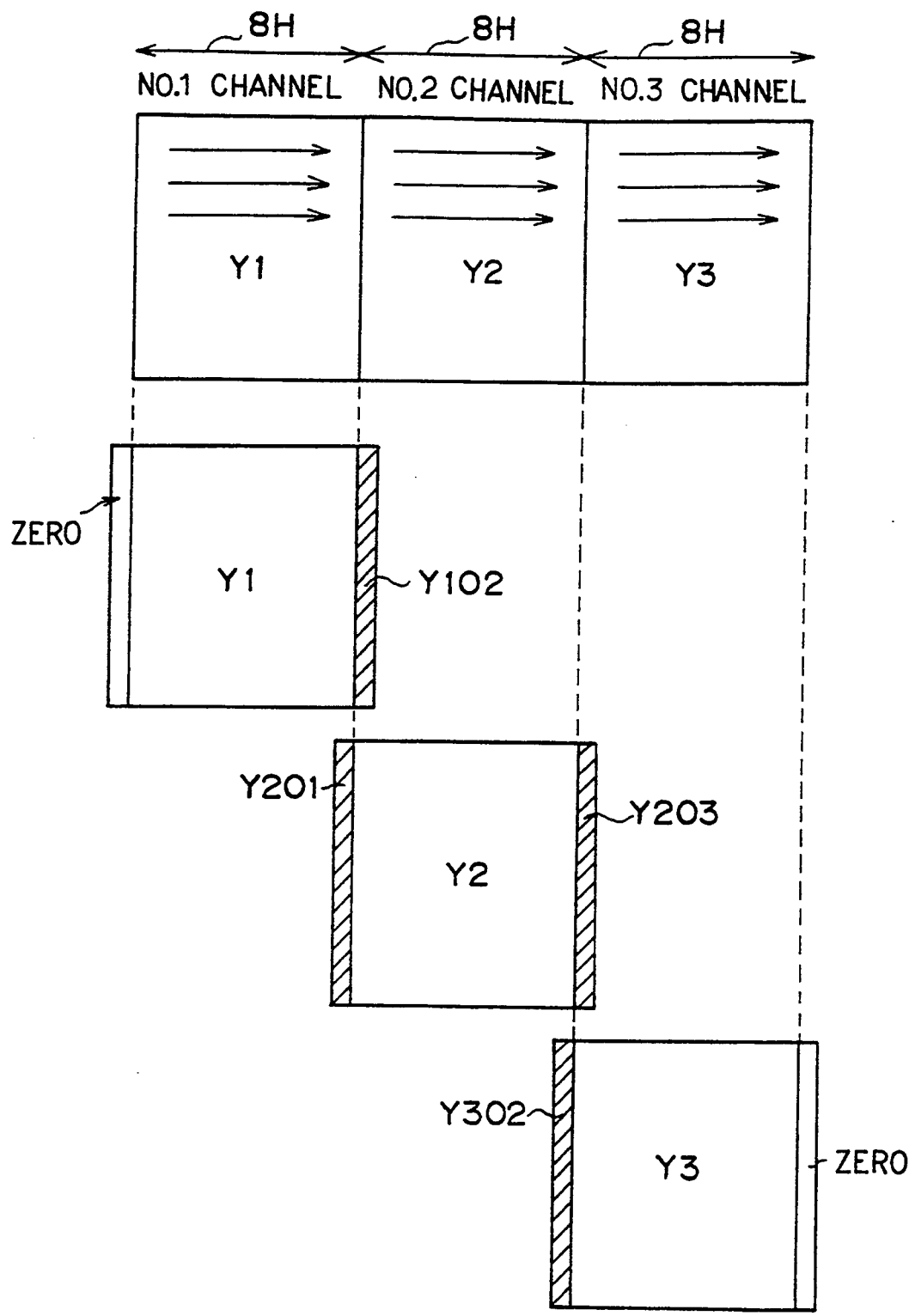
FIG. 17 is a diagram for illustrating the overlapping operation which is performed in the third embodiment of the motion picture encoding system.

To avoid this, in this motion picture processing apparatus 70, sufficient search ranges of motion vectors are provided to channel border portions, and the overlapping circuit 45B, as shown in FIG. 17, performs overlapping processing to add data to brightness signals Y from adjacent channels which are produced by the division of a picture.

More specifically, in FIG. 17, a case where brightness signals Y are divided into three signals; first, second and third brightness signals Y1, Y2 and Y3 is studied with the shaded portions indicating the overlapped portions. First, an overlapped portion Y102 is formed by overlapping the right-side of the first brightness signal Y1 with data of the second brightness signal Y2, and then an overlapped portion Y102 is formed by overlapping the left-side of the second brighter signal Y2 with data of the first brightness signal Y1.

Furthermore, an overlapped portion Y203 is formed by overlapping the right-side of the second brightness signal Y2 with data of the third brightness signal Y3, whereas an overlapped portion Y302 is formed by overlapping the left-side of the third brightness signal Y3 with data of the second brightness signal Y2. These are added to leading and trailing portions of each channel.

The leading portion of the first brightness signal Y1 and the trailing portion of the third brightness signal Y3 serve to make the timing between channels equal, and have no relation with picture quality. Therefore, logic 'O' is added to the front leading portion of Y1. It is sufficient for each overlapping portion to have a width to merely meet necessary search window.

Figure 18:
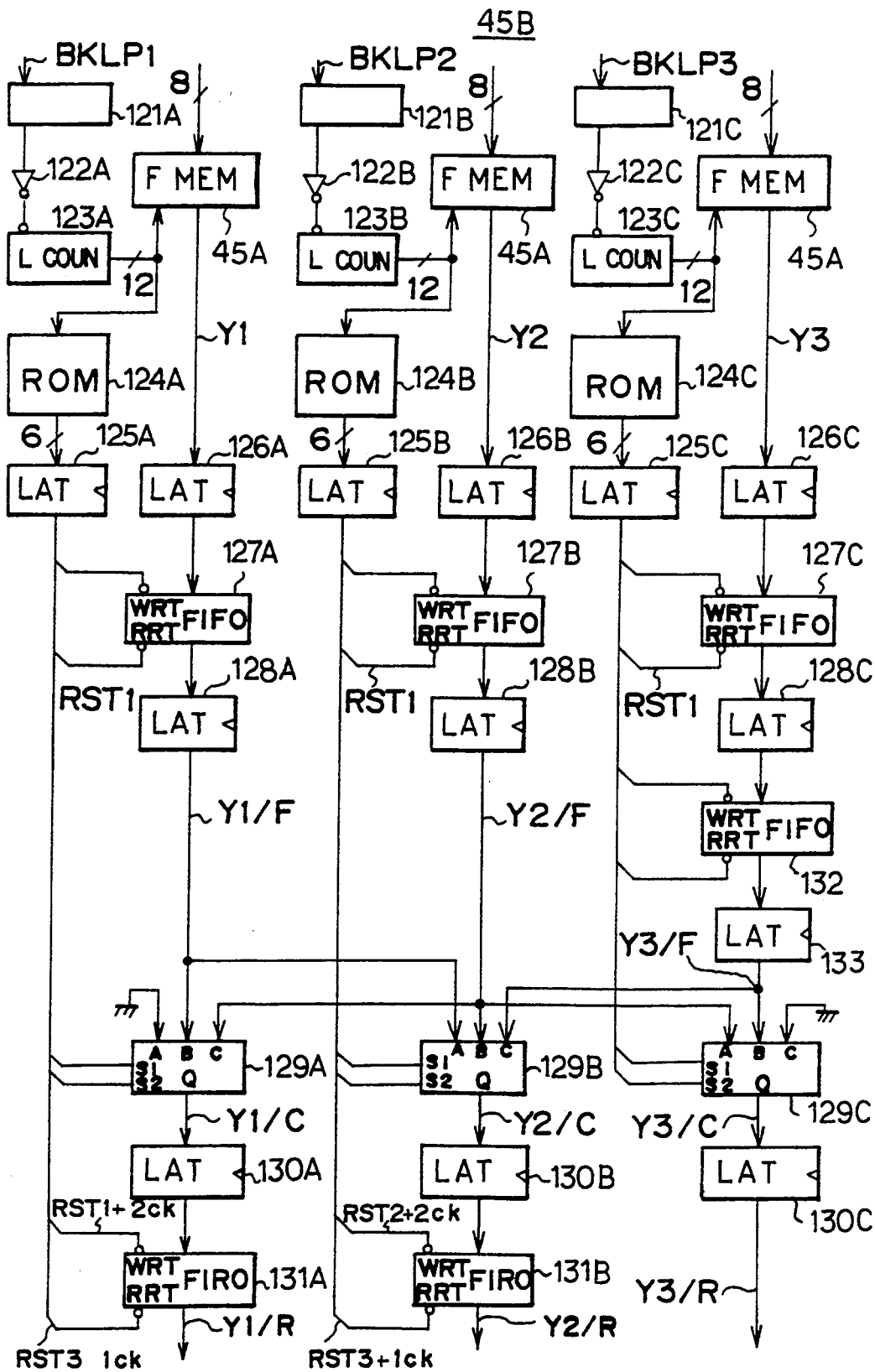
FIG. 18 is a block diagram showing the detailed configuration of the overlapping circuit in the third embodiment of the motion picture encoding system.

To realize such overlapping, the overlapping circuit 45B is constructed as shown in FIG. 18. The processing of each channel is independently conducted in the other processing portions of the apparatus, except for the necessary interactions of data of the adjacent channels.

Figure 19:
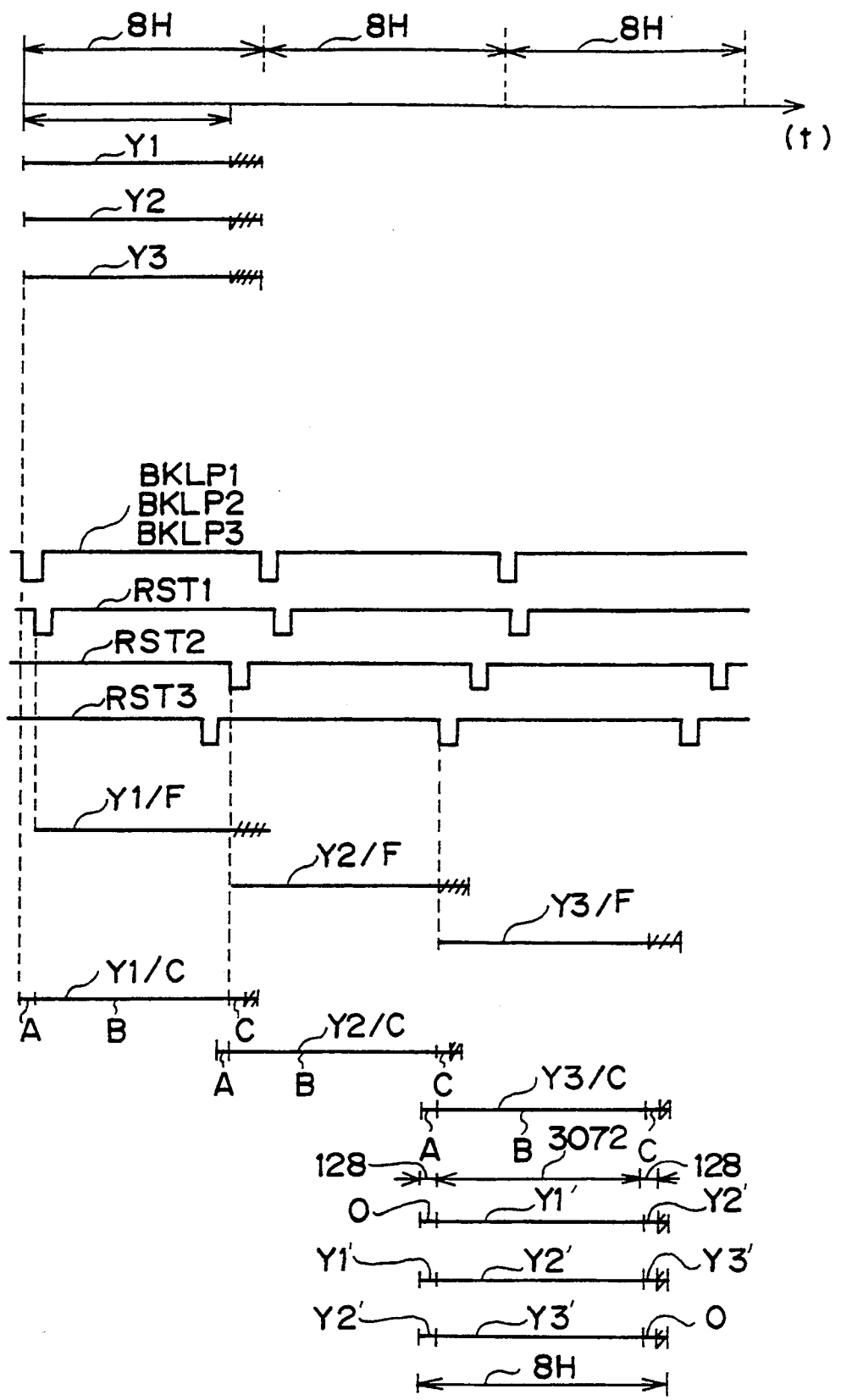
FIG. 19 is a diagram illustrating the operation of the overlapping circuit of FIG. 18.

In practice, data is read out from frame memories (composed of RAM) 45A every 8H data in synchronization with one block line pulse BKLP1, BKLP2 and BKLP3. Each bit RST1, RST2 and RST3 which controls a delay of data of each channel is stored in ROM 124A, 124B and 124C, respectively, so that FIFO (first in first out) memory 127A, 127B and 127C is read out at the timing shown in FIG. 19.

The first, second and third brightness signals Y1, Y2 and Y3, respectively, which are simultaneously supplied from the frame memories 45A are delayed so that the second brightness signal Y2 is supplied after the first brightness signal Y1 and the third brightness signal Y3 is supplied after the second brightness signal Y2. The ROMs make timing counters for channels unnecessary, and the circuit is simplified.

In each channel, data of adjacent channels are added to the leading and trailing portions of delayed data Y1/F, Y2/F, Y3/F, which has been delayed for a predetermined time, according to a select signal from the ROM.

Delay compensation is performed on the data of the first brightness signal Y1 channel and the second brightness signal Y2 channel so that they have the same timing as the data of the third brightness signal Y3 channel which has the longest delay due to the FIFO memory. Thus, overlapped data Y1/R, Y2/R and Y3/R are obtained and the overlapping processing is completed in such a manner. These overlapped signals are supplied to the motion compensation circuit 55, where they are used according to the motion vectors in a channel independent manner.

According to the foregoing construction, a picture is divided into channels, which undergo motion adaptive coding in a parallel manner. In other words, a picture is divided into a plurality of blocks, via channels, where it is assumed that a given motion is parallel to each of the block. That is divided from the picture. In motion adaptive coding, data of adjacent channels are overlapped on the border portions of their respective channel and the classification of motion vectors is conducted, extending to overlapping regions which overlap with the adjacent channels. Thus, motion adaptive quantization can be performed without consequence of the channel border portions. This realizes a motion picture coding apparatus which is capable of preventing misjudging a motion as fast at the channel portions, and thereby preventing degradation in picture quality due to influences of the channel division.

Moreover, according to the construction previously described, the overlapping circuit is provided to the local decoding system, and thereby there is provided a motion picture coding apparatus which is capable of preventing an increase of the transmission amount of information to the overlapping regions. Furthermore, a motion picture coding apparatus of a simple construction is realized by constructing overlapping circuits in a channel independent fashion with ROMs.

In the embodiment previously described, the overlapping circuit according to the present invention is applied to the motion adaptive coding apparatus. The overlapping circuit according to the present invention is not limited to this, but may be applied to the so-called motion compensation coding apparatus. In this case, it is not the object to maintain continuity of motion vectors in channel borders but to make the appropriate matching to reduce the information amount of the remainder by providing the maximum amount of search windows in the borders.

Further, in the embodiment previously described, the case in which the present invention is applied to the motion picture coding apparatus for coding high definition television signals is described. The present invention is not limited to this, and may be suitably and widely applied to motion picture coding apparatuses which divide and parallel process a picture.

According to the third embodiment as described, overlapping processing is performed between divided channels. Therefore, there is no misjudging the motion as fast in border portions of the channels, and in motion compensation coding it is possible to avoid transmission of an unnecessary amount of information due to inappropriate matching at channel border portions. In both the cases, deterioration in picture quality, due to division of the channels, is therefore prevented, and a motion picture coding apparatus is provided which is capable of substantially improving picture quality.

While this invention has been described in conjunction with the preferred embodiments thereof, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A motion adaptive picture encoder comprising:

blocking means for dividing input picture data into blocks, each of which includes n pixels in both horizontal and vertical directions (n × n) in spatial allocation;

orthogonal transformation means for orthogonally transforming each of said blocks of the picture data;

quantizing means for quantizing orthogonally transformed coefficients of orthogonally transformed picture data from said orthogonal transformation means;

inverse quantizing means for inversely quantizing the orthogonally transformed coefficients of the picture data from said quantizing means;

inverse orthogonal transformation means for inversely orthogonally transforming the orthogonally transformed coefficients of the picture data from said inverse quantizing means;

storage means for storing one frame of the inversely orthogonally transformed picture data from said inverse orthogonal transformation means;

motion vector detection means for detecting a motion vector for each of said blocks from the respective input picture data and from the respective inversely orthogonally transformed picture data in said storage means, each said motion vector determining either a fast or a slow mode of motion for the respective one of said blocks;

classifying means for classifying said blocks into classes comprised of blocks of a fast motion picture region and blocks of a slow motion picture region, respectively, on the basis of the motion vector detected by said motion vector detection means for the respective block;

differential computing means for computing, for each of said blocks, a difference data between the respective input picture data and the respective inversely orthogonally transformed picture data from said storage means;

block power calculating means for calculating a power of each of said blocks of the input picture data and of the respective difference data; and quantizing step width control means for adaptively changing the quantization step width of said quantizing means and said inverse quantizing means on the basis of the powers calculated by said block power calculating means for each of said blocks of the input picture data and of the respective difference data and on the basis of the one of said classes into which the respective block is classified by said classifying means, so as to assign a rough quantizing step width to blocks of the fast motion picture region and a fine quantizing step width to blocks of the slow motion picture region.

2. The motion adaptive picture encoder according to claim 1, wherein said classifying means includes means for performing a Mode Assignment Procedure, and means for determining said classes of a target block and blocks surrounding said target block on the basis of said fast or slow mode of motion of said target and surrounding blocks, said classes of the target block and the surrounding blocks forming the basis of a quantizing step plane thereunder.

3. The motion adaptive picture encoder according to claim 2, wherein said classifying means further includes means for comparing said mode of motion of said target block with said mode of motion of said surrounding blocks and selectively inverting said mode of motion of said target block to said mode of motion of said surrounding blocks so that said mode of motion of said target block is the same as said mode of motion of said surrounding blocks.

4. A method for adaptively encoding a motion picture, comprising the steps of:

dividing input picture data into blocks, each of which includes n pixels in both horizontal and vertical direction (n × n) in spatial allocation;

orthogonally transforming said picture data of each of said blocks;

quantizing orthogonally transformed coefficients of the orthogonally transformed picture data;

inversely quantizing said quantized data of orthogonally transformed coefficients;

inversely orthogonally transforming said orthogonally transformed coefficients of the inversely quantized picture data;

storing one frame of the inversely orthogonally transformed picture data;

detecting a motion vector for each of said blocks from the respective input picture data from the respective inversely orthogonally transformed picture data, each said motion vector determining either a fast or a slow mode of motion for the respective one of said blocks;

classifying said blocks into classes comprised of blocks of a fast motion picture region and blocks of a slow motion picture region, respectively, on the basis of the motion vector detected for each of said blocks;

computing, for each of said blocks, a difference data between the respective input picture data and the respective stored inversely orthogonally transformed picture data;

calculating a power of each of said blocks of said input picture data and of the respective difference data; and said input picture data; and adaptively changing the quantization step width in said steps of quantizing and inverse quantizing on the basis of the power calculated for each of said blocks and on the basis of the one of said classes into which the respective block is classified, so as to assign a rough quantizing step width to blocks of the fast motion picture region and a fine quantizing step width to blocks of the slow motion picture region.

5. A motion adaptive picture decoder for decoding coded picture data derived by:

dividing input picture data into blocks, each of which includes n pixels in both horizontal and vertical directions (n × n) in spatial allocation;

orthogonally transforming said picture data of each of said blocks;

quantizing orthogonally transformed coefficients of the orthogonally transformed picture data;

inversely quantizing said quantized data of orthogonally transformed coefficients;

inverse orthogonally transforming said orthogonally transformed coefficients of the inversely quantized picture data;

storing one frame of said inversely orthogonally transformed picture data;

detecting a motion vector of each of said blocks of said input picture data and of the respective stored inversely orthogonally transformed picture data, each said motion vector determining either a fast or slow mode of motion for each of said blocks;

classifying said blocks into classes comprised of blocks of a fast motion picture region and blocks of a slow motion picture region, respectively on the basis of said respective mode of motion of each of said blocks;

computing, for each of said blocks, a difference data between the respective input picture data and the respective stored inversely orthogonally transformed picture data;

calculating a power of each of said blocks of said input picture data and the respective difference data; and adaptively changing the quantization step width in said steps of quantizing and inverse quantizing on the basis of said power of each of said blocks and on the basis of the one of said classes into which the respective block is classified, so as to assign a rough quantizing step width to blocks of the fast motion picture region and a fine quantizing step width to blocks of the slow motion picture region, said decoder comprising:

buffer memory means for storing said quantized data;

inverse quantizing means for inversely quantizing said quantized data stored in said buffer memory means in correspondence to said step of quantizing;

inverse orthogonal transforming means for inversely orthogonally transforming said inversely quantized data to said step of orthogonally transforming; and motion compensation processing means for motion compensating said picture data from said inverse orthogonal transforming means.

6. The motion picture encoder according to claim 1, further comprising:

a time division multiplexing circuit coupled to said blocking means for dividing input picture data into a plurality of adjacent channels, said adjacent channels having border portions, and supplying said divided picture data to said blocking means; and overlapping means for overlapping a portion of said picture data in said border portions of said adjacent channels.

7. A motion picture encoding apparatus comprising:

a time division multiplexing circuit for dividing picture data into a plurality of adjacent channels, said adjacent channels having border portions;

a motion detecting circuit for detecting motion of said divided picture data and producing an output signal;

a motion adaptive control circuit for motion compensating said output signal derived from said motion detection circuit on the basis of previous and current frame data;

orthogonal transformation means for generating orthogonally transformed coefficients by orthogonally transforming said picture data from said motion adaptive control circuit;

quantizing means for quantizing orthogonally transformed coefficients of picture data orthogonally transformed by said orthogonal transformation means;

inverse quantizing means for inverse quantizing said orthogonally transformed coefficients quantized by said quantizing means;

inverse orthogonal transformation means for inversely transforming said orthogonally transformed coefficients of said picture data inversely quantized by said inverse quantizing means; and memory means having an overlap/frame memory for storing and overlapping one frame of said picture data inversely orthogonally transformed by said inverse orthogonal transforming means, said motion detection circuit detects motion vector from picture data stored within said memory means and said motion picture data; and said memory means is an overlap/frame memory having said border portions of said adjacent channels being overlapped for adaptively coding said picture data, and said picture data stored within said memory means being supplied to said motion detection circuit for detecting a motion vector of said picture data.

8. The motion adaptive picture encoder according to claim 3, wherein said means for comparing comprises a majority decision filter.

9. The motion picture decoder according to claim 5, further comprising:

a time division multiplexing circuit for dividing said picture data into a plurality of adjacent channels, said adjacent channels having border portions; and overlapping means for overlapping a portion of said picture data in said border portions of said adjacent channels.

* * * * *